(12) United States Patent
Reichert et al.

(10) Patent No.: US 11,416,958 B1
(45) Date of Patent: Aug. 16, 2022

(54) MOBILE SITE WATCH

(71) Applicant: EnergySherlock LLC, Leesburg, VA (US)

(72) Inventors: Tim Reichert, Leesburg, VA (US); Chinya Harleston, Ashburn, VA (US); Sherman Vandevender, Jr., Lovettsville, VA (US); Kyle W. W. Reichert, Leesburg, VA (US)

(73) Assignee: Energysherlock LLC, Leesburg, VA (US)

( * ) Notice: Subject to any disclaimer, the term of this patent is extended or adjusted under 35 U.S.C. 154(b) by 489 days.

(21) Appl. No.: 15/430,278

(22) Filed: Feb. 10, 2017

Related U.S. Application Data

(60) Provisional application No. 62/293,758, filed on Feb. 10, 2016, provisional application No. 62/351,280, filed on Jun. 16, 2016.

(51) Int. Cl.
*G06Q 50/26* (2012.01)
*H04W 4/021* (2018.01)
*H04L 67/10* (2022.01)
*G06Q 10/10* (2012.01)

(52) U.S. Cl.
CPC ....... *G06Q 50/265* (2013.01); *G06Q 10/1091* (2013.01); *H04L 67/10* (2013.01); *H04W 4/021* (2013.01)

(58) Field of Classification Search
CPC .... G06Q 40/10; G06Q 10/103; G06Q 50/265; G06Q 10/1091; H04W 4/021; H04L 67/10
USPC .................................................. 705/32, 301
See application file for complete search history.

(56) References Cited

U.S. PATENT DOCUMENTS

| | | | |
|---|---|---|---|
| 4,700,318 | A | 10/1987 | Ockman |
| 6,038,547 | A | 3/2000 | Casto |
| 6,421,586 | B1 | 7/2002 | Nicotera |
| 6,842,760 | B1 | 1/2005 | Dorgan et al. |
| 7,031,930 | B2 | 4/2006 | Freeman et al. |
| 7,062,514 | B2 | 6/2006 | Harris |
| 7,107,278 | B1 | 9/2006 | Bandemer |

(Continued)

OTHER PUBLICATIONS

Prior Art Search Published Dec. 22, 2015.

*Primary Examiner* — Ariel J Yu
*Assistant Examiner* — Denisse Y Ortiz Roman
(74) *Attorney, Agent, or Firm* — Fresh IP PLC; Clifford D. Hyra; Aubrey Y Chen

(57) ABSTRACT

A method and system for monitoring people, projects, objects and properties to validate the status and quality of work completed, services provided and safety issues. The methods and systems described herein provides for a business solution (B2B, B2C and B2G) and consumer solution (C2C and C2B) that will receive data relating to tracking the onsite/offsite time of people assigned to perform a service or complete a task within a specified location, time-interval visual/audio status updates of work completed, map view to monitor multiple people, projects, objects and properties simultaneously, emergency and safety alerts for workers, safety ratings and reporting safety issues for schools/public/private spaces, tracking the delivery of mailed objects, smart mailbox and smart lockbox components, and white labeling of the mobile application to allow business users to brand it for their customers.

19 Claims, 38 Drawing Sheets

(56) References Cited

U.S. PATENT DOCUMENTS

| | | | |
|---|---|---|---|
| 7,720,703 B1 | 5/2010 | Broughton | |
| 7,752,065 B2 | 7/2010 | Buzz | |
| 7,984,184 B2 | 7/2011 | Woon et al. | |
| 8,041,650 B2 | 10/2011 | Gaffey et al. | |
| 8,326,664 B2 | 12/2012 | Fukuda et al. | |
| 8,615,415 B2 | 12/2013 | Deguchi et al. | |
| 8,738,414 B1 | 5/2014 | Nagar et al. | |
| 8,782,093 B2 | 7/2014 | Greer et al. | |
| 8,805,731 B2 | 8/2014 | Harris | |
| 9,020,848 B1* | 4/2015 | Ridge | G07C 1/10 705/32 |
| 9,070,216 B2 | 6/2015 | Golparar-Fard et al. | |
| 9,536,216 B1* | 1/2017 | Lisso | B65B 35/56 |
| 9,998,866 B2* | 6/2018 | Natucci, Jr. | H04W 4/029 |
| 2004/0064326 A1* | 4/2004 | Vaghi | B07C 3/00 705/401 |
| 2010/0111357 A1* | 5/2010 | Manuel-Devadoss | A47G 29/1201 382/101 |
| 2010/0179853 A1* | 7/2010 | Garcia | G06Q 10/0631 705/7.12 |
| 2011/0208797 A1* | 8/2011 | Kim | H04L 67/2842 709/202 |
| 2012/0066019 A1 | 3/2012 | Hinshaw et al. | |
| 2012/0084108 A1 | 4/2012 | Bohannon et al. | |
| 2013/0290054 A1 | 10/2013 | Jung et al. | |
| 2013/0324166 A1* | 12/2013 | Mian | H04W 4/021 455/457 |
| 2013/0339078 A1 | 12/2013 | Harris et al. | |
| 2014/0039954 A1 | 2/2014 | Wong et al. | |
| 2014/0207512 A1 | 7/2014 | Khanzode et al. | |
| 2014/0244329 A1 | 8/2014 | Urban | |
| 2014/0278705 A1 | 9/2014 | Tuggle | |
| 2014/0316837 A1 | 10/2014 | Fosburgh et al. | |
| 2014/0327768 A1 | 11/2014 | Marshall | |
| 2015/0106144 A1 | 4/2015 | Mangerson et al. | |
| 2016/0217422 A1* | 7/2016 | Dujisin | G06Q 10/103 |
| 2016/0312446 A1* | 10/2016 | Pettersson | E02F 3/842 |
| 2017/0004427 A1* | 1/2017 | Bruchal | G06Q 10/06311 |
| 2017/0178434 A1* | 6/2017 | Firth | G07C 9/00571 |
| 2017/0289329 A1* | 10/2017 | Yim | G06F 3/048 |
| 2018/0240099 A1* | 8/2018 | Bester | G06Q 20/40 |

\* cited by examiner

Method of creating a polygon geofence and determining when a particular person has entered and exited the geofence and calculating the time the person spent in the geofence. The MSW app automatically know when the user's ICD enters and exits the geofence.

Method of a person manually clocking in and clocking out of a geofence. The person will use either an ICD or FOB with the application to push a "clock in" button when entering the geofence to time/GPS stamp they are within the geofence, and the person will push a "clock out" button when exiting the geofence to time/GPS stamp they are no longer within the geofence.

FIG. 4

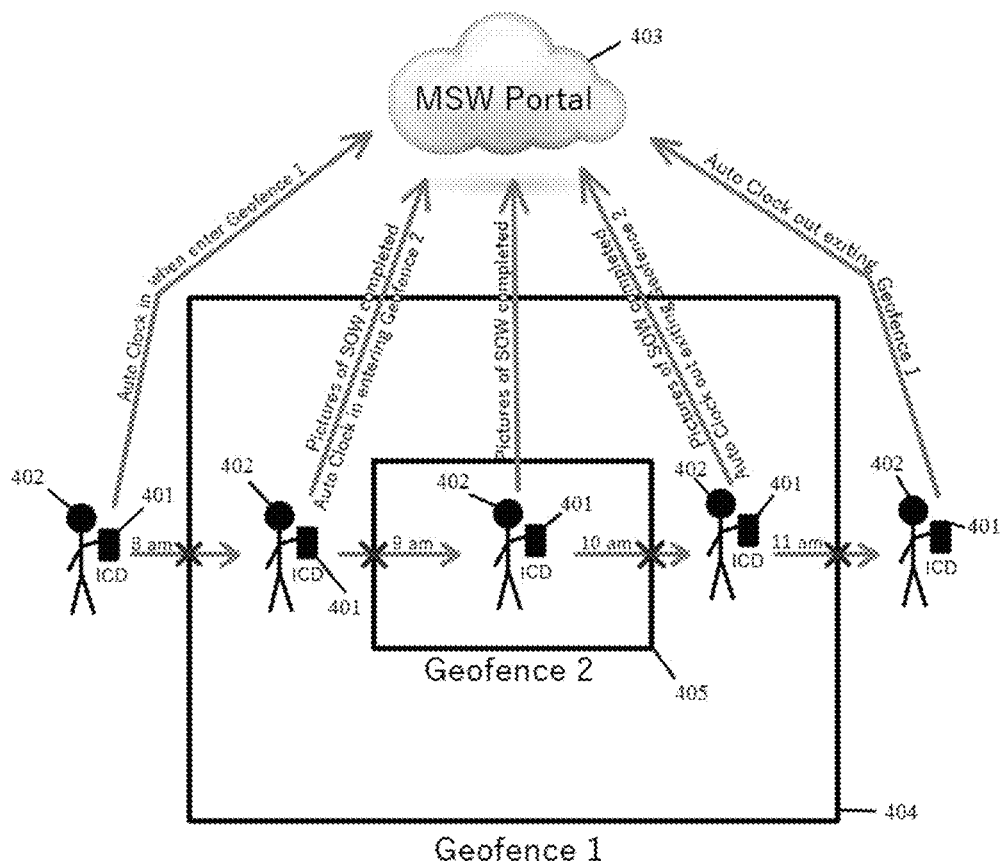

Method of tracking activity in an area, and determining when a particular person has entered/exited multiple geofenced areas, and determining whether the particular person performed a task within each geofenced area. The user takes/submits pictures or video SOW completed in a geofenced area to the MSW portal. The MSW portal validates via time/GPS stamp on all data recieved, the amout of time each user spends within each geofence, and visual proof of SOW completed.

FIG. 16

| Geofence Name | Stadium | Main Parking Lot |
|---|---|---|
| # of Responders | 100 | 200 |
| Total Points Given | 600 | 1,500 |
| Average Rating | 6.0 | 7.5 |
| Total Safety Issues last 30 days | 8.0 | 5.0 |
| Historical Rating | 7.5 | 6.0 |
| Current Rating | 6.5 1601 | 6.9 1602 |

FIG. 17

| Safety Issue Reported by User | Credibility Points (1 to 5, 5 highest) |
|---|---|
| Adult, over 40 | 4 |
| Teacher | 5 |
| Others reporting issue: 4 | 5 |
| Number of prior reports from user: 0 | 1 |
| Safety rating of area: 7.5 | 2 |
| Type of safety issue reported in area: 5 | 5 |
| Total Credibility Score | 22 – Very Credible |

Communication

FIG. 31A

| Project | | | | | |
|---|---|---|---|---|---|
| Project number | Home Instead | | Customer Name | | |
| SOW Doc | Assist eating a meal. Do walking protocol | | | | |
| SOW Categories | Complaint, Other, Medical-Administer Medicines, Medical-Wound Dressings, Non-Medical Feeding Assistance | | | | |
| Start Date | 12/2/15 | | End Date | 10/2/15 | |
| Daily Start Time | 8:30:00 | | Daily End Time | 9:30:00 | |
| Pictures | 4 every 1 Hour(s) | | | | |
| Instruction | Patient goal to walk unassisted 5 minutes or 50 feet | | | | |
| Sub-Contractor | % Completed | Est. Completion Date | Est. Completion Time | | |
| Medical - Physical T | 50% | 10/2/15 | 9:00 | | |
| Non-Medical | 100% | 10/2/15 | 8:42 | | |
| Category Name | Estimated Completion Date/Time | Percentage | Submitted By | Submitted On | Uploaded From |
| Medical Physical T | 10/2/15 | 9:00 | 50% tyler reichert | 2015-10-02 00.50.31 | Get Address |
| Non-Medical Feeding | 10/2/15 | 8:42 | 100% tyler reichert | 2015-10-02 00.50.06 | Get Address |
| SOW Category Images | | | | | |

| Deepaks painting project 20148 | |
|---|---|
| Customer | MSW |
| Assign Team Members | Deepak Shinde |
| Start Date | May 20, 2016 |
| Estimated End Date | May 22, 2016 |
| Completed | 0% |
| Total Labor Hours | On-Site Hours 00:00 |
| | Off-Site Hours 00:00 |
| Total Materials | $0 |
| Value of Contract | $1,000.00 |
| | |
| SOW CATEGORIES | |
| | |
| Paint Front Door Framing | |
| Estimated Completion Date | May 22, 2016 |
| Completed | |
| Submitted By: | Test Manager |
| Submitted On: | May 20, 2016 |

3102

MSW Smart Lockbox

FIG. 35

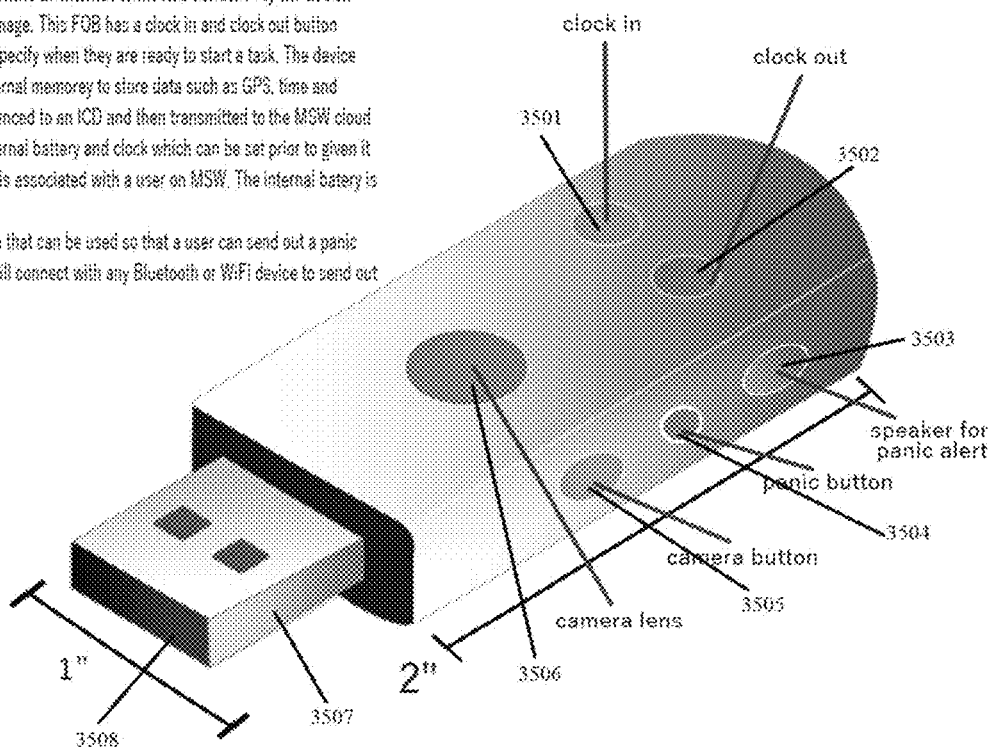

This is for users that do not have an internet connected device. They will use an MSW hardware similar to image. This FOB has a clock in and clock out button which the user can use to specify when they are ready to start a task. The device has a camera on it with internal memorey to store data such as GPS, time and images. This data is then synced to an ICD and then transmitted to the MSW cloud server. The FOB has an internal battery and clock which can be set prior to given it out and the unique FOB ID is associated with a user on MSW. The internal batery is rechargeable via the USB.
There is also a panic button that can be used so that a user can send out a panic signal that is audible and will connect with any Bluetooth or WiFi device to send out a location.

FIG. 36

| Crew | % Completed | Est. Completion Date | Est. Completion Time |
|---|---|---|---|
| Electrical | 100% | 5/1/17 | Noon |
| Plumbing | 70% | 5/3/17 | 10am |
| Painter | 50% | 5/4/17 | 4pm |
| Windows/Doors | 0% | 5/10/17 | 5pm |

| Electrical Contractor | % Completed | Est. Completion Date | Est. Completion Time |
|---|---|---|---|
| Crew 1 | 100% | 5/1/17 | Noon |
| Crew 2 | 70% | 5/3/17 | 10am |
| Crew 3 | 50% | 5/4/17 | 4pm |
| Crew 4 | 0% | 5/10/17 | 5pm |

3601

MOBILE SITE WATCH

This application claims the benefit of U.S. Provisional Applications No. 62/293,758, filed Feb. 10, 2016, and No. 62/351,280, filed Jun. 16, 2016, which are hereby incorporated by reference in their entirety.

FIELD OF THE INVENTION

Mobile Site Watch, or "MSW," as disclosed herein, is an application for a device. The application overcomes a myriad of existing problems with such applications as detailed in the following disclosure. In the case of MSW, the term "mobile device" refers to internet connected devices (ICD) like smartphones, regular GPS enabled phones, smart watches, tablets, fitness bands, and any device that can connect to the internet and transfer data. MSW technology covers all Geofencing that uses GPS enabled devices that run data over the TCP/IP stack.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein. Certain embodiments disclosed herein describe a mobile application for watching a site. More particularly, certain embodiments disclosed herein describe monitoring people, projects, objects and properties to confirm the status and quality of work completed, services provided and safety within geofenced zones.

A new method and system monitors people, projects, objects and properties to validate the status and quality of work completed, services provided and safety within geofenced zones. The methods and systems described herein provides for a business solution (B2B, B2C and B2G) and consumer solution (C2C and C2B) that receives data relating to tracking the onsite/offsite time of people assigned to perform a service or complete a task within a specified geofenced location, time-interval visual status updates of work completed, map view to monitor multiple people, projects and properties simultaneously, emergency and safety alerts, and white labeling of the mobile application to allow business users to brand it for their customers.

Mobile Site Watch (MSW) may be implemented as a client server application based on a 4 tier architecture. The four tiers are as follow:

Tier 1: Front-end Tier which is a Web Portal written in HTML 5 and PHP 5.0 using Larevel PHP framework. There is also a mobile application component that is written in HTML5 and able to run on the entire iPhone ecosystem, Android ecosystem and windows ecosystem otherwise called Internet Connected Devices (ICDs).

Tier 2: This is the business logic tier that has all the defined business functions of MSW that sit in the cloud. It includes: A system for tracking activity in an area, comprising: one or more ICDs; a geofence definer; an entrance/exit of geofence determiner; a time calculator to measure how long an ICD lingers inside/outside specific geofences; a task/activity monitor; where the geofence definer uses unlimited non-symmetrical polygon points to define a geofenced area; where the entrance/exit determiner makes determinations as to whether a user has entered or existed the geofenced area; where the time calculator calculates a time the user spent in the geofenced area and outside of the geofenced area; and where the task/activity monitor uses the capability to assign tasks that require actions with the ICD's that get reported using the sensors on ICD's.

Tier 3: Database Tier is where all the data for the application is persisted.

Tier 4: Application Programing Interface tier is where all the relevant data elements in the MSW database are exposed so that other applications can consume and integrate.

These and further and other objects and features of the invention are apparent in the disclosure, which includes the above and ongoing written specification, with the drawings.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted. The term "MSW Portal in the cloud" "MSW Portal" and "MSW Subportal" in the figure illustrations references the entire MSW software as defined above.

FIG. 4 is an illustration depicting the method of automatically tracking activity in a polygon geofence and determining when a particular person has entered/exited multiple polygon geofences and if a task was performed within any polygon geofence(s).

FIG. 16 is a table that shows how overall safety scores are calculated.

FIG. 17 is a table that shows how credibility ratings are calculated for reported safety issues.

FIGS. 31A and 31B are screenshots depicting exemplary embodiments of a project view in MSW.

FIG. 35 is an illustration depicting a FOB mobile device according to an embodiment of MSW for users that do not have an ICD.

FIG. 36 is a table depicting how different tradesmen working the same project report the status of completion and estimated date/time of completion.

DETAILED DESCRIPTION OF THE PREFERRED EMBODIMENTS

Figure 1:
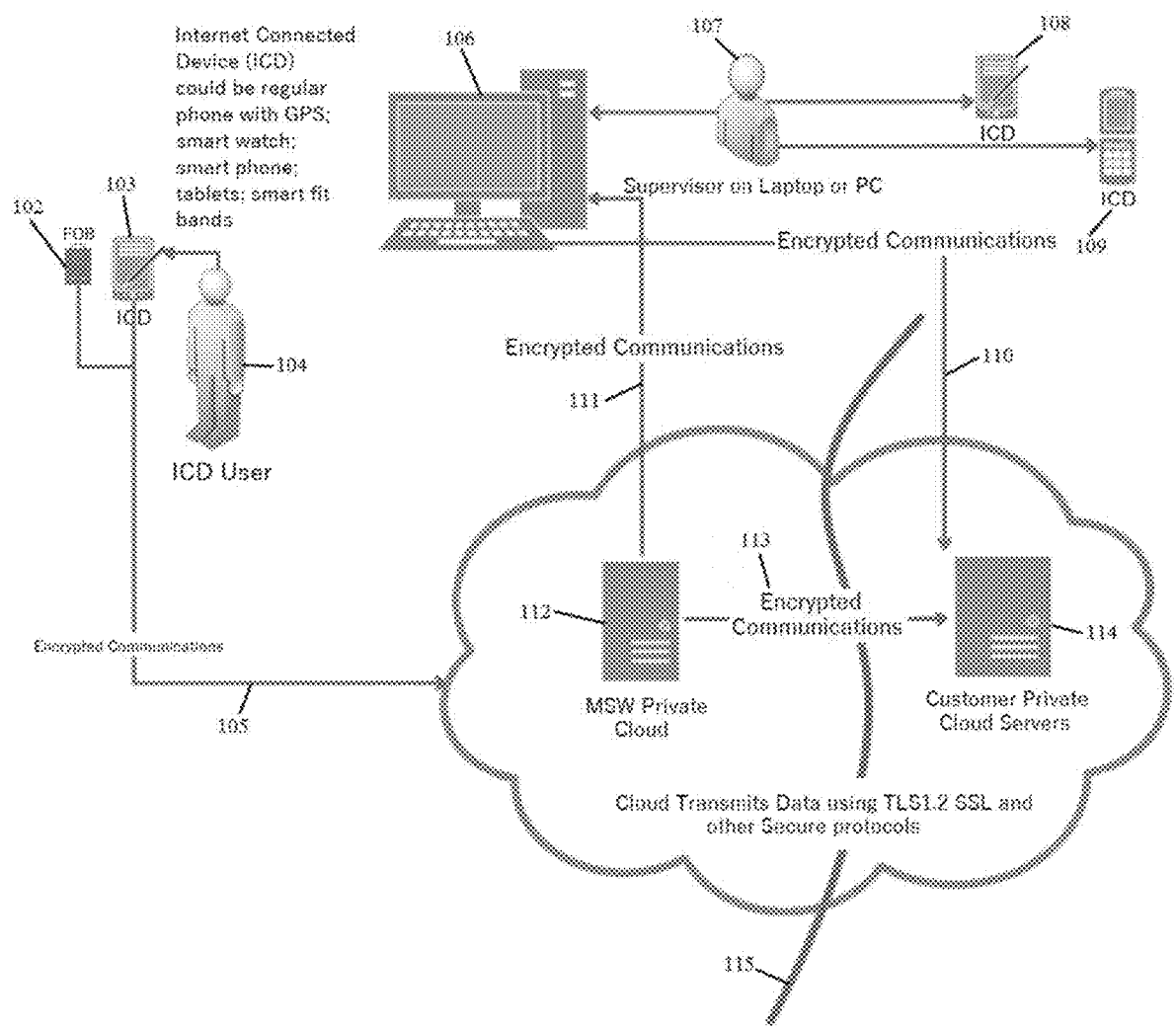
FIG. 1 is a schematic depicting interfaces between component parts of an embodiment of MSW for tracking activity in a polygon geofence.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the terms "and/or" and "or" include any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The invention in embodiments includes a GPS/Geofence-based software application or "app." Embodiments are utilized for managing people/projects, particularly service providers and contractors including one or more of the following features. Embodiments are also utilized for safety and security of schools, public and private properties.

Categories of Internet Connected Devices (ICD)

The mobile application may be deployed on any type of ICD such as, but not limited to:

- Internet of Things (IoT) devices such as smart thermostats; smart lights; refrigerators; stoves; microwaves; TV's; gaming devices; DVD's; etc.
- Mobile devices such as smart phones; smart watches; eye wearables; tablets; laptops; notebooks; etc
- Automotive which includes cars; motorcycles; smart bicycles; trucks; boats; airplanes; Drones; space vehicles; etc.

Categories of the Sensors that are Used in Mobile ICDs

The mobile application incorporates a wide range of data points from various sensors that are within ICDs such as, but not limited to:

- Accelerometer—Measures change in movement of the device
- Thermometer—Measures changes in temperature
- Gyroscopes—Measure orientation of the device
- Magnetometer—Measures changes in magnetic fields to identify compass direction relative to the earth's magnetic north
- Proximity sensor—These utilize an infrared Light Emitting Diode (LED) and an Infrared (IR) light detector to determine distance from the device
- Oxygen Sensors—Measures oxygen using IR reflection in humans skin
- Heart Rate Sensor—Used to measure heart rate of a person or living person
- Altimeter/Barometers—Measures the altitude of the device based on changes in Barometric pressure
- Light Sensor—Measures changes in Ambient light
- Microphones—Detects sounds waves and volume
- IR based thermometers—The ability to show differences in temperature based on looking through the Infrared bands
- Humidity Sensors—Use to measure the humidity of an environment
- Fingerprint sensors—Used for biometric data on the device
- Camera sensors—Used for Iris reading and facial recognition detection
- Radiation Sensors—Measure the radiation within an area or a predetermined Geofence
- GPS Sensor—Measures the location of a device on the entire surface of the earth
- Sensors that support all wireless technologies mentioned above.
- Signal strength
- Battery strength Categories of how ICDs Communicate and Connect with Each Other The mobile application uses a variety of communication protocols and methods that enable ICDs to transfer sensor data to the application via wireless, Wi-Fi, or wired technologies such as, but not limited to:

- Radio-Frequency Identification (RFID) and near-field communication (NFC)—In the 2000s, RFID was the dominant technology. Later, NFC became dominant. NFC has become common in smartphones during the early 2010s, with uses such as reading NFC tags or for access to public transportation.
- Rapid developments in optical technologies like Li-Fi, Cisco's 40 Gbit/s bidirectional optical technology may aid the development of IoT.
- Optical tags and quick response codes—This is used for low cost tagging. Phone cameras decode Quick Response (QR) code using image-processing techniques. In reality QR advertisement campaigns give less turnout as users need to have another application to read QR codes.
- Bluetooth low energy (BLE)—This is one of the latest technologies. All newly releasing smartphones have BLE hardware in them. Tags based on BLE can signal their presence at a power budget that enables them to operate for up to one year on a lithium coin cell battery.
- Low energy wireless IP networks—embedded radio in system-on-a-chip designs, lower power WiFi, sub-GHz radio in an ISM band, often using a compressed version of IPv6 called 6LowPAN.
- ZigBee—This communication technology is based on the IEEE 802.15.4 2.4 Ghz-band radio protocol to implement physical and MAC layer for low-rate wireless Private Area Networks. Some of its main characteristics like low power consumption, low data rate, low cost, and high message throughput make it an interesting IoT enabler technology.
- Z-Wave—is a communication protocol that is mostly used in smart home applications. It uses a radio protocol in the 900 Mhz-band.
- Thread—Like ZigBee, this IoT communication technology relies on the IEEE 802.15.4 2.4 Ghz-band radio protocol. A key difference is that its networking protocol is IPv6-compatible.
- LTE-Advanced—LTE-A is a high-speed communication specification for mobile networks. Compared to its original LTE, LTE-A has been improved to have extended coverage, higher throughput and lower latency. One important application of this technology is Vehicle-to-Vehicle (V2V) communications.
- WiFi-Direct—It is essentially WiFi for peer-to-peer communication without needing to have an access point. This feature attracts IoT applications to be built on top of WiFi-Direct to get benefit from the speed of WiFi while they experience lower latency.
- HomePlug—This networking standard can be used to enable IOT communication over a home or building's power lines
- MoCA—This networking standard can be used to enable IOT communication over CATV-type coaxial cable
- Ethernet—This general purpose networking standard can be used to enable IoT communication over twisted pair or fiber network links Category of Data that Sensors Collect and can Communicate to ICDs All the data mentioned above can be accessed through specific application programing interfaces as provided for by the device's operating system, which is not limited to Android; iOS; Symbian; Blackberry; Windows; Linux; etc.

FIG. 1 is a schematic depicting interfaces between component parts of an embodiment of MSW for tracking activity in a polygon geofence. Referring to FIG. 1, a system for tracking activity in an area 112 may be access by a supervisor 107 on a laptop or PC 106 over an encrypted communication line 111. The supervisor 107 will use the system 112 to create polygon geofenced zones and scope of work to be performed within the created geofence(s), and this information is accessible by users 104 using an ICD 103 over an encrypted communication line 105. Users 104 are able to use an ICD 103 or FOB 102 to be geolocated by the system 112, as well as submit time inside/outside of a geofence(s) and pictures of scope of work performed within a geofence to the system 112. All sensors on ICD 103 and FOB 102 are recorded locally on each ICD respectively and the sensor data is transferred to system 112 and stored on system 112 after the data is transferred successfully. The supervisor 107 is able to use a variety of mobile devices such as ICD 108 and ICD 109 to use the system 112 for 2-way communication with user 104. The interface between supervisor 107 to user 104 is transmitted from devices 108/109 to 112 and then to 102/103. System 112 communicates via an encrypted line 113 with the customer private cloud applications 114, and the cloud transmits data using TLS1.2 SSL 115 to user 104 via ICD 103/102 and supervisor 107 via ICD 106.

Figure 2:
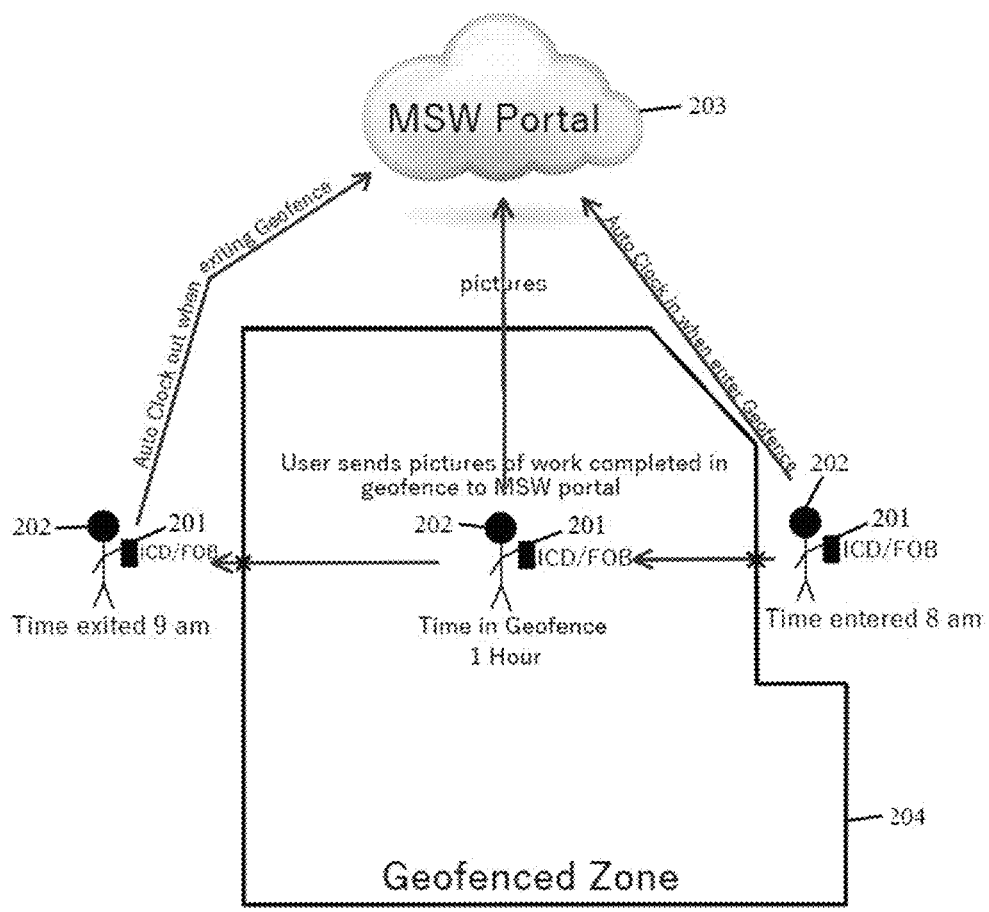
FIG. 2 is an illustration depicting the method of automatically tracking the time entering and exiting a polygon geofence and confirming whether a task was performed.

FIG. 2 is an illustration depicting the method of automatically tracking the time entering and exiting a polygon geofence and confirming whether a task was performed. Referring to FIG. 2 an ICD 201 with the MSW app loaded and turned on, is carried by user 202 across a geofence boundary 204 and ICD 201 automatically sends the GPS and time of user 202 (clocks into geofence 204) to the MSW portal 203. While in geofence 204, user 202 uses ICD 201 to take a picture of the task user 202 completed within geofence 204, and ICD 201 automatically sends the picture to MSW portal 203. User 202 then carries ICD 201 and exits geofence boundary 204 and ICD 201 automatically sends the GPS and time of user 202 (clocks out of geofence 204) to the MSW portal 203. MSW calculates the amount of time of user 202 both inside and outside of geofence 204.

Figure 3:
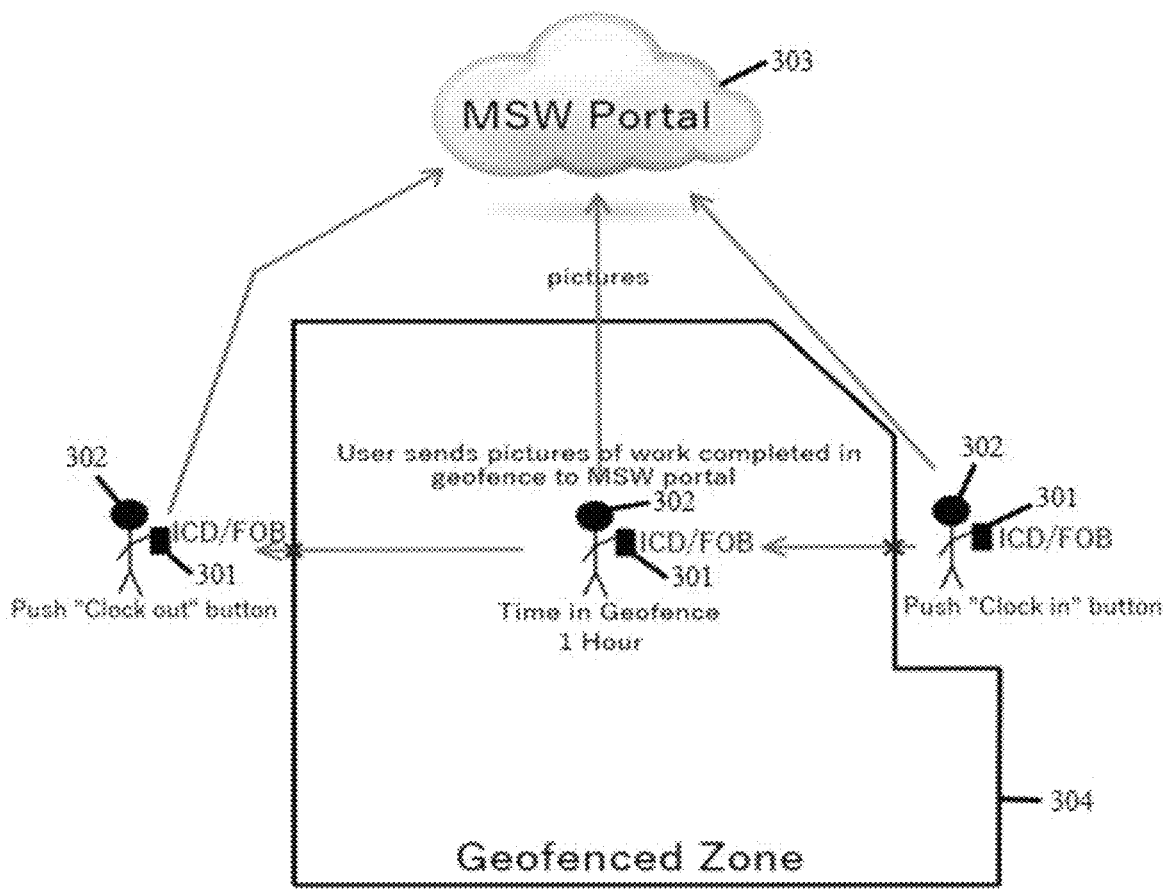
FIG. 3 is an illustration depicting the method of manually tracking the time entering and exiting a polygon geofence and confirming whether a task was performed.

FIG. 3 is an illustration depicting the method of manually tracking the time entering and exiting a polygon geofence and confirming whether a task was performed. Referring to FIG. 3 an ICD/FOB 301 with the MSW app loaded and turned on, is carried by user 302 across a geofence boundary 304. User 302 pushes a "clock in" button on the ICD/FOB 301 to manually send the GPS and time of user 302 (clocks into geofence 304) to the MSW portal 303. While in geofence 304, user 302 uses the ICD/FOB 301 to take a picture of the task user 302 completed within geofence 304, and ICD/FOB 301 automatically sends the picture to MSW Portal 303. User 302 then carries ICD/FOB 301 and exits geofence boundary 304 and pushes the "clock out" button on the ICD/FOB 301 to manually send the GPS and time of user 302 (clocks out of geofence 304) to the MSW portal 303. MSW calculates the amount of time of user 302 both inside and outside of geofence 304.

FIG. 4 is an illustration depicting the method of automatically tracking activity in a polygon geofence and determining when a particular person has entered/exited multiple polygon geofences and if a task was performed within any polygon geofence(s). Referring to FIG. 4 an ICD 401 with the MSW app loaded and turned on, is carried by user 402 across a geofence boundary 404 and ICD 401 automatically sends the GPS and time of user 402 (clocks into geofence 404) to the MSW portal 403. While in geofence 404, user 402 uses ICD 401 to take a picture of the task user 402 completed within geofence 404, and ICD 401 automatically sends the picture to MSW Portal 403. User 402 then carries ICD 401 across geofence boundary 405 and ICD 401 automatically sends the GPS and time of user 402 (clocks into geofence 405 and still clocked into geofence 404) to the MSW portal 403. While in geofence 405, user 402 uses ICD 401 to take a picture of the task user 402 completed within geofence 405, and ICD 401 automatically sends the picture to MSW Portal 403. User 402 carries ICD 401 and exits geofence 405 and ICD 401 automatically sends the GPS and time of user 402 (clocks out of geofence 405 and still clocked into geofence 404). User 402 carries ICD 401 and exits geofence 404 and ICD 401 automatically sends the GPS and time of user 402 (clocks out of geofence 404) to the MSW Portal 403.

Figure 5:
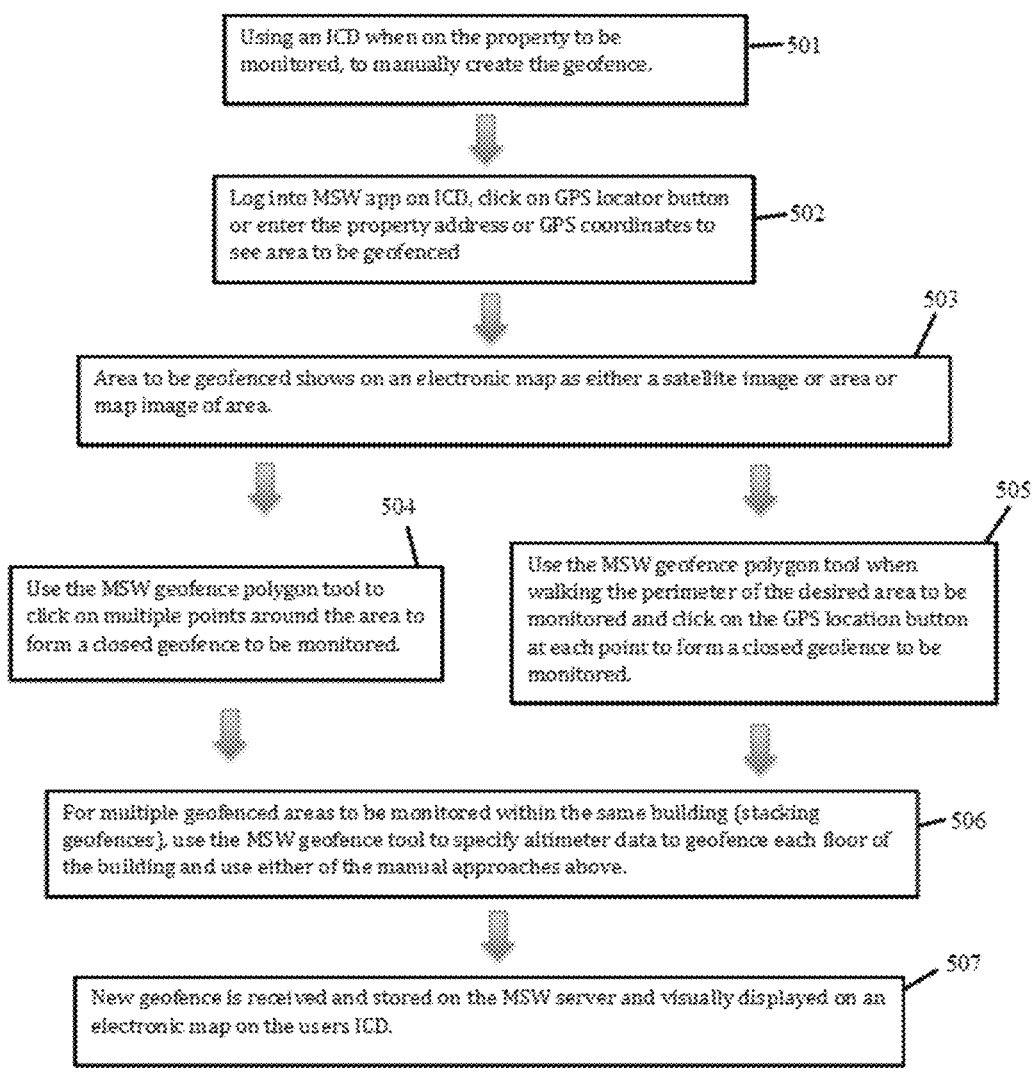
FIG. 5 depicts the steps to manually create a polygon geofence using an ICD when on the property to be monitored.

FIG. 5 depicts the steps to manually create a polygon geofence using an ICD when on the property to be monitored. Referring to FIG. 5 a user that is on the property the user wants to geofence for monitoring 501, uses an ICD with the MSW app loaded and turned on to click on the GPS locator button or to enter the property address or GPS coordinates for the property 502. The ICD will display an electronic map with a pushpin of the user's location 503 and the user can choose to use the MSW geofence polygon tool and click on multiple points around the map to form a closed geofence 504, or use the MSW geofence polygon tool when walking the perimeter of the desired area and click on the GPS location button at each point to form a closed geofence 505. To create a plurality of geofences within the same building (stacking geofences), the user will use the MSW geofence polygon tool on the ICD to specify altimeter data for each floor of the building 506 and then use either of the manual approaches 504 or 505 to create closed geofences. When a new geofence is created on the ICD, the ICD will automatically send the geofence data to the MSW Portal server and the ICD will visually display the geofence on an electronic map on the users ICD 507.

Figure 6:
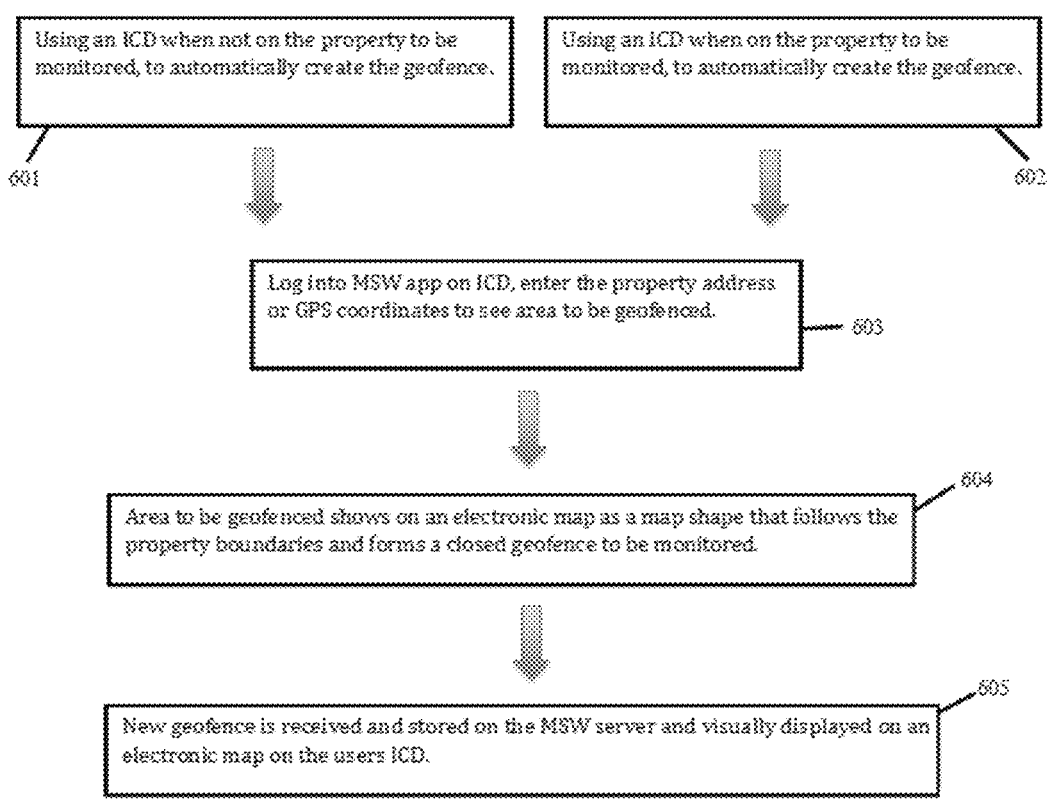
FIG. 6 depicts the steps to automatically create a polygon geofence using an ICD when on or off the property to be monitored.

FIG. 6 depicts the steps to automatically create a polygon geofence using an ICD when on or off the property to be monitored. Referring to FIG. 6 a user that is either off the property to be monitored 601 or on the property to be monitored 602, uses an ICD with the MSW app loaded and turned on to enter the property address or GPS coordinates for the property 603. The ICD will display an electronic map with a closed geofence automatically shaped to follow the property boundaries to be monitored 604. When a new geofence is created on the ICD, the ICD will automatically send the geofence data to the MSW Portal server and visually display the geofence on an electronic map on the users ICD 605.

Figure 7:
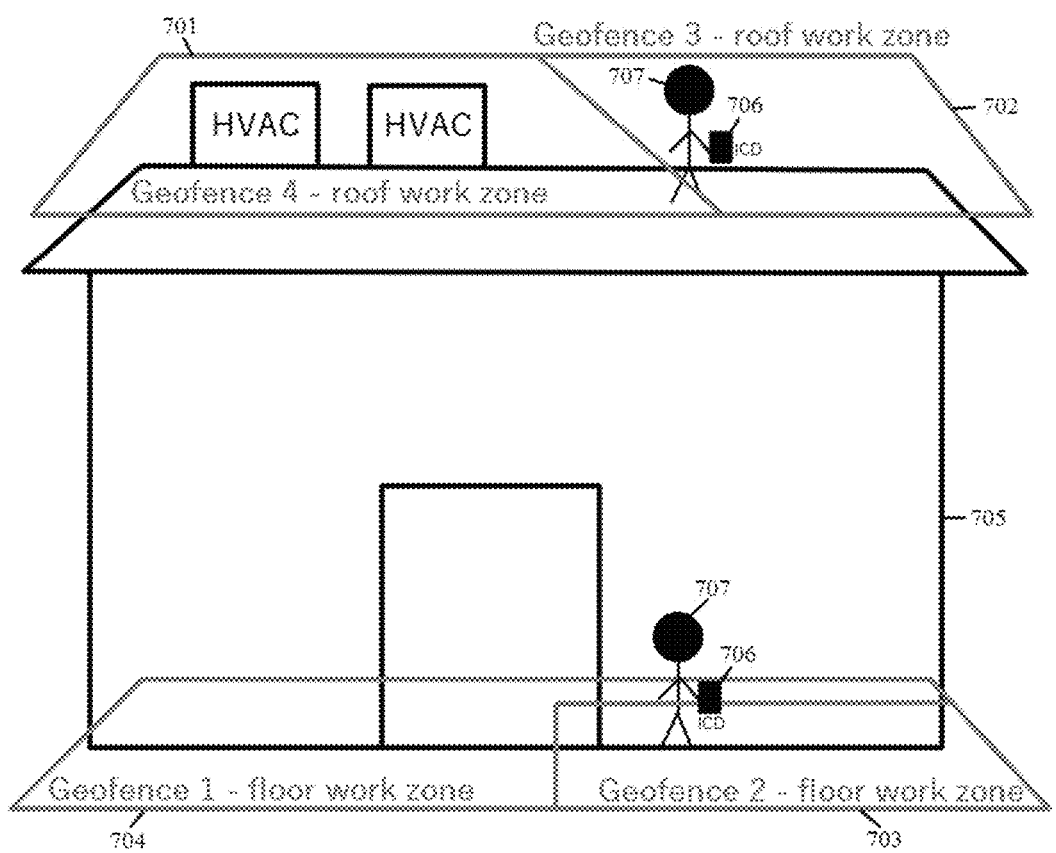
FIG. 7 is an illustration depicting the stacking of a plurality of asymmetrical polygon geofences on top of each other or within each other on the same level.

FIG. 7 is an illustration depicting the stacking of a plurality of asymmetrical polygon geofences on top of each other or within each other on the same level. Referring to FIG. 7 a building 705 has two ground level geofences 704 and 703, whereby geofence 704 is a different shape and size as compared with geofence 703. Building 705 also has two roof level geofences 701 and 702, whereby geofence 701 is a different shape and size as compared with geofence 702. Moreover, geofences 701, 702, 703 and 704 are asymmetrical shapes that do not share equal shape or size to demonstrate stacked geofences can be unique in size and shape. User 707 is carrying ICD 706 with MSW app loaded and turned on to allow GPS and time tracking of user 707 within any geofence.

Figure 8:
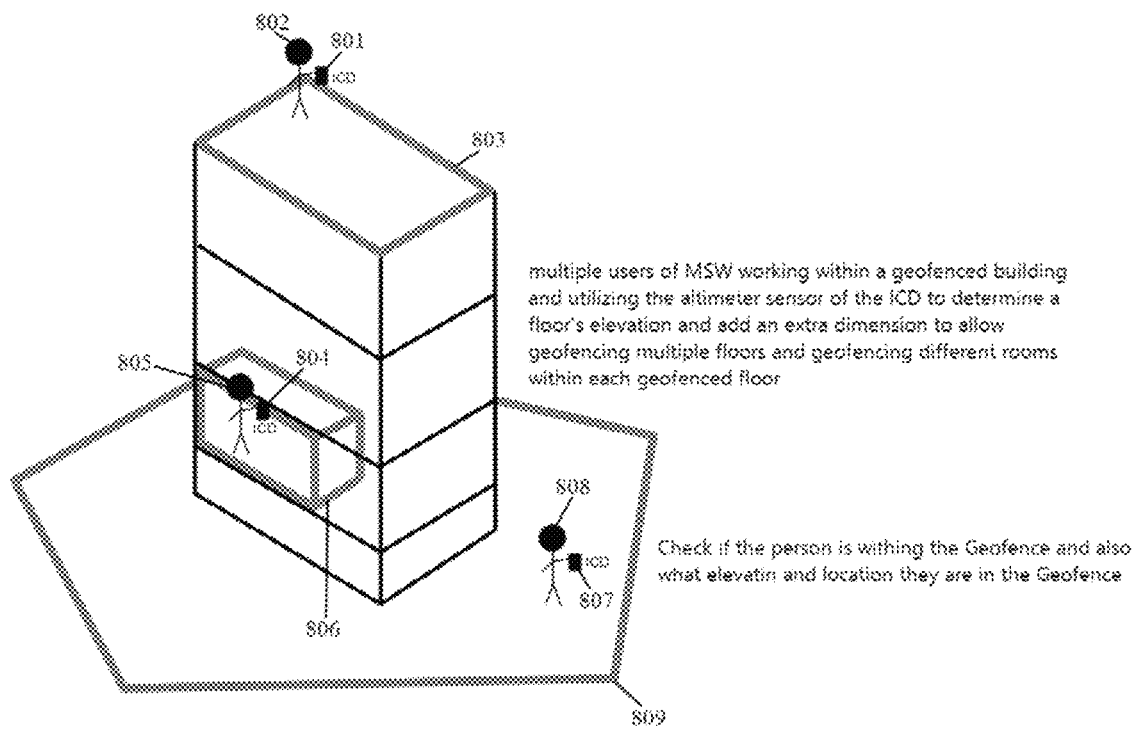
FIG. 8 is an illustration depicting an embodiment where multiple users of MSW are working within a geofenced building and using the altimeter sensor of an ICD to calculate elevation and enabling geofencing of different floors and rooms within floors.

FIG. 8 is an illustration depicting an embodiment where multiple users of MSW are working within a geofenced building and using the altimeter sensor of an ICD to calculate elevation and enabling geofencing of different floors and rooms within floors. Referring to FIG. 8 user 802 is using ICD 801 with MSW app loaded and turned on to enable altimeter sensor data to be incorporated to create a top floor geofence 803. User 805 is using ICD 804 with MSW app loaded and turned on to enable altimeter sensor data to be incorporated to create a 2$^{nd}$ floor office room geofence 806. User 808 is using ICD 807 with the MSW app loaded and turned on to create a ground level geofence 809. ICDs 801, 804 and 807 are tracked for GPS location, time inside and outside of geofences 803, 806 and 809 and work performed in any geofence.

Figure 9:
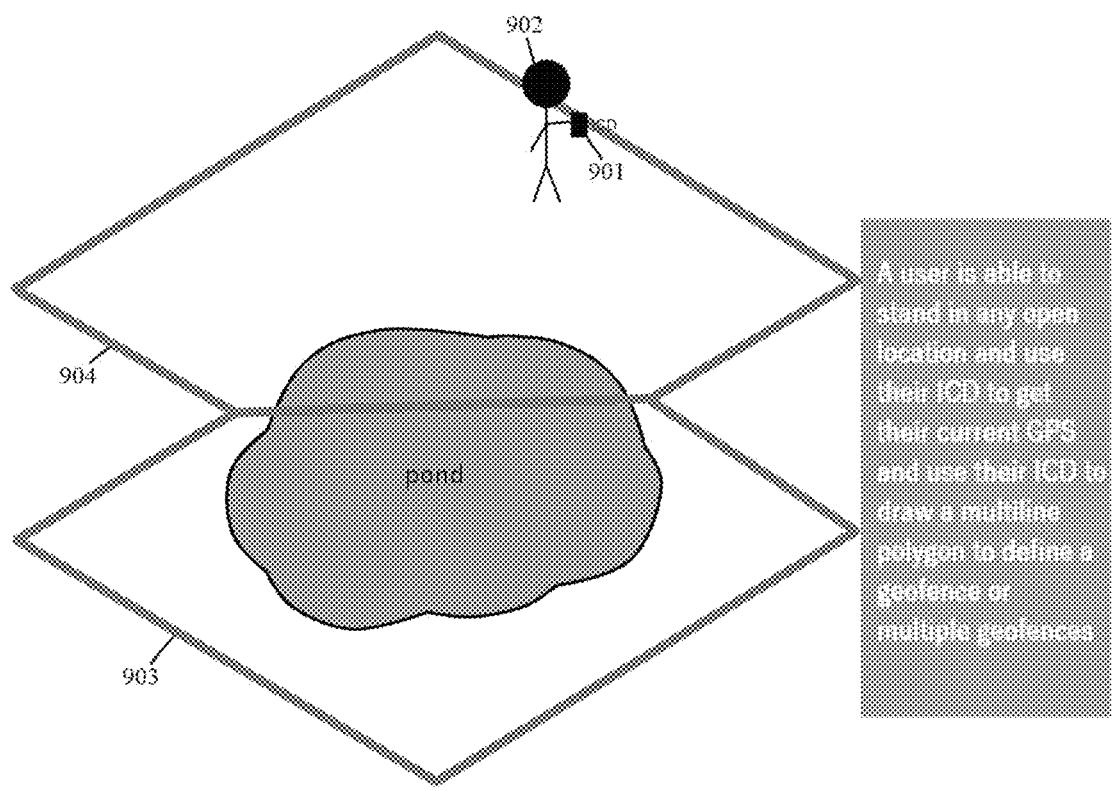
FIG. 9 is an illustration depicting an embodiment with user standing in an open location and using their ICD to draw a multiline polygon to define an adjoining polygon geofence having Geofence Zone 1 and Geofence Zone 2.

FIG. 9 is an illustration depicting an embodiment with a user standing in an open location and using their ICD to draw a multiline polygon to define an adjoining polygon geofence having Geofence Zone 1 and Geofence Zone 2. Referring to FIG. 9 user 902 is using ICD 901 with MSW app loaded and turned on in an open location to get user 902 geolocation. User 902 is using ICD 901 to manually create geofence 904 and geofence 903.

Figure 10:
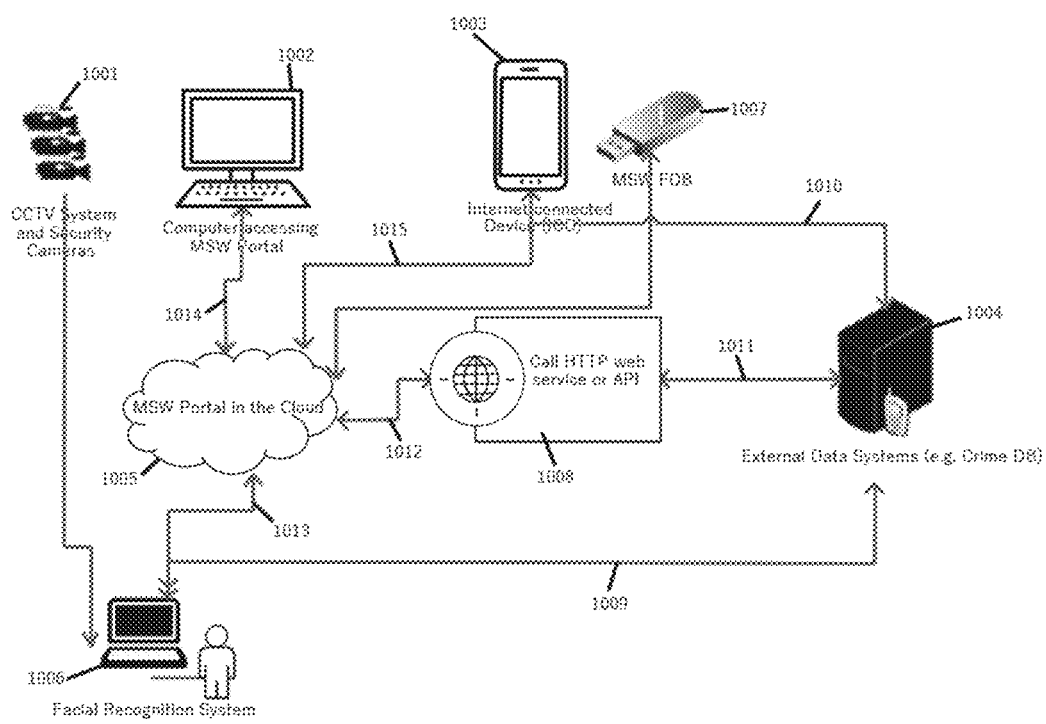
FIG. 10 is a schematic depicting interfaces between component parts of an embodiment of MSW for reporting safety issues in a polygon geofenced area.

FIG. 10 is a schematic depicting interfaces between component parts of an embodiment of MSW for reporting safety issues in a polygon geofenced area. Referring to FIG. 10, a system for tracking and reporting safety issues 1005 can be accessed by security staff using a computer 1002 or internet connected device (ICD) 1003. All users have access to the MSW application via ICD 1003 and MSW FOB 1007. The user, through the ICD 1003 or FOB 1007 is able to report safety related incidences to safety personnel and other personnel's ICD and FOB's via lines 1015, 1014 to system 1005. CCTV cameras 1001 that are on any of the premises that have been geofenced in system 1005. The CCTV system 1001 is fed to a facial recognition system 1006 which then sends data via communication line 1013 to system 1005 which in turn can feed the data back to user and supervisor devices 1003 and 1002 via communication lines 1014 and 1015 to inform them of known people of interest such as felons. The data from the CCTV's 1001 is also fed to an external crime database system 1004 (e.g. law enforcement, prison systems, etc.) via communication line 1009. The MSW system 1005 communicates with the external crime system 1004 via HTTP web services 1008 via communication lines 1012 and 1011. All ICD 1003 users are also able to communicate directly to the external data system 1004 via line 1010.

Figure 11:
FIG. 11 is an illustration depicting the "one touch" buttons used to report a safety issue within a specific polygon geofenced area.

FIG. 11 is an illustration depicting the "one touch" buttons used to report a safety issue within a specific polygon geofenced area. Referring to FIG. 11 this MSW screenshot displays the one touch buttons to report a safety concern 1101 and button 1102 represents a type of safety concern a user may report.

Figure 12:
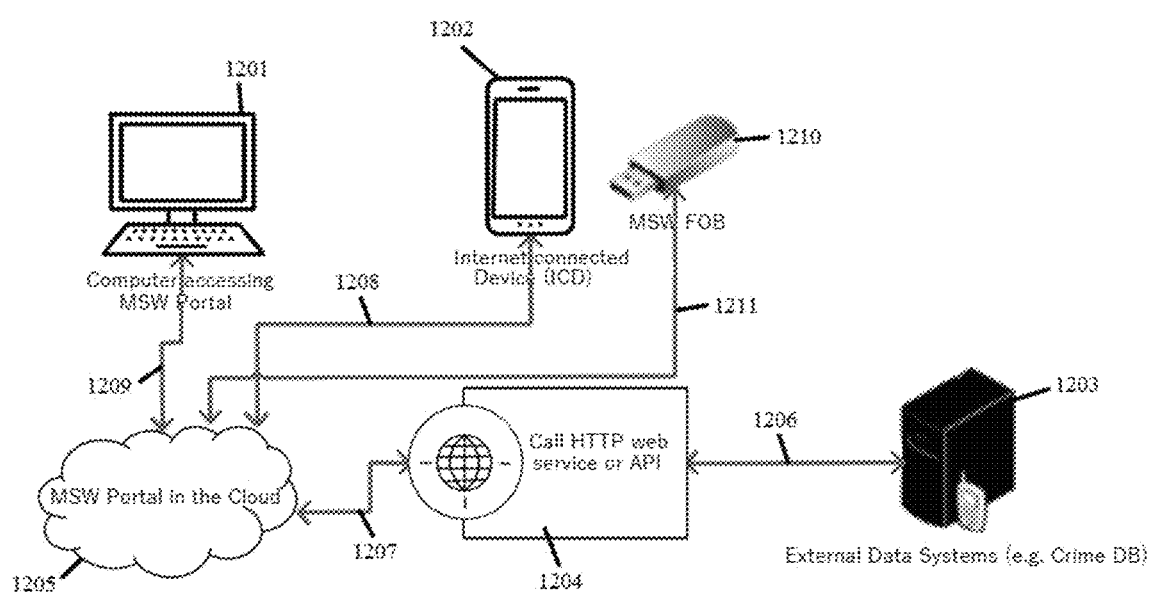
FIG. 12 is a schematic depicting interfaces between component parts of an embodiment of MSW to detect time sheet inaccuracies and fraud.

FIG. 12 is a schematic depicting interfaces between component parts of an embodiment of MSW to detect time sheet inaccuracies and fraud. Referring to FIG. 12, a system for tracking and reporting on personnel timekeeping fraud issues 1205 can be accessed by supervisors on ICD 1202 via communication line 1208 and computer 1201 via communication line 1209. Staff users being monitored access the MSW system 1205 via communication line 1208 on ICD 1202 or via communication line 1211 on FOB 1210. The MSW mobile application lives on ICD 1202 or FOB 1210 and the user is able to report issues to the MSW system 1205. The MSW system 1205 is able to communicate with external customer timesheet keeping system 1203 via MSW API/Web service 1204 via communication lines 1206 and 1207. The MSW system 1205 has the logic to check how much time a user's ICD 1202 or FOB 1210 was inside a designated geofence that a user is assigned to perform tasks and compare the automatic geofence recorded time with the time reported by the user in their company's external time keeping system 1203.

Figure 13:
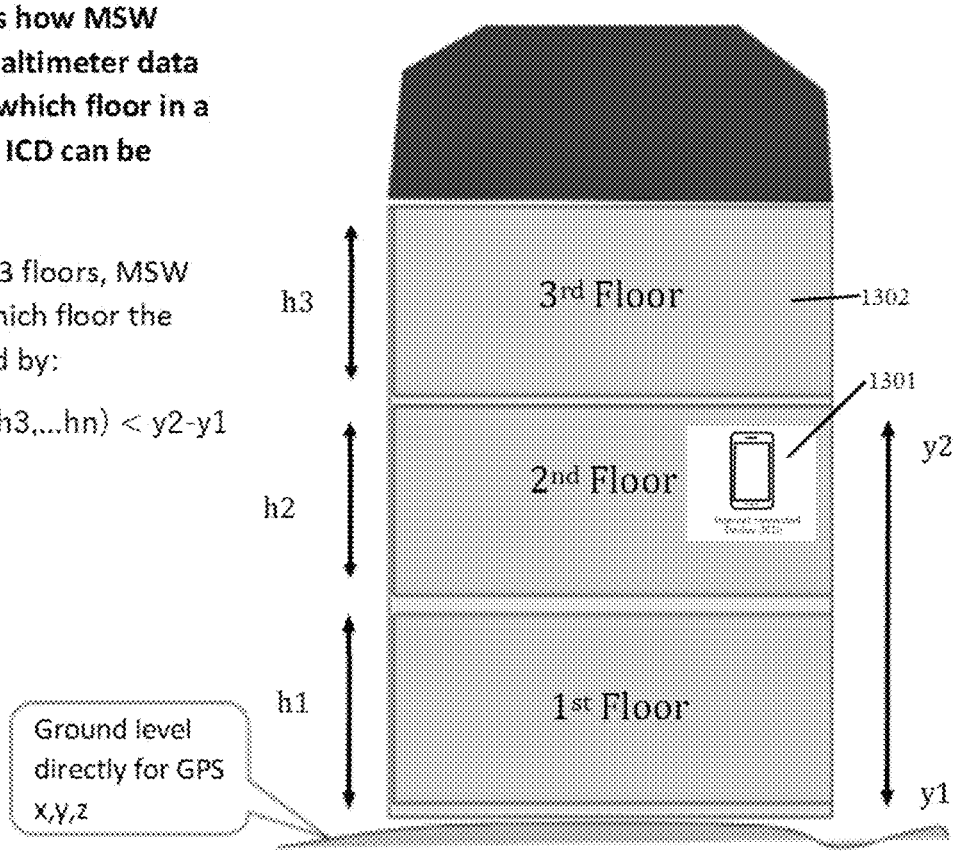
FIG. 13 is an illustration depicting how altimeter data from an ICD is used to calculate which floor in a building is to be geofenced.

FIG. 13 is an illustration depicting how altimeter data from an ICD is used to calculate which floor in a building is to be geofenced. Referring to FIG. 13, an illustration that shows a user ICD 1301 with the MSW application installed and turned on located on the 2$^{nd}$ floor of a building 1302. The user ICD 1301 uses the altimeter sensor data in combination with other sensor data from ICD 1301 to calculate how far above ground level ICD 1301 is located to determine which floor in building 1302 that it is located. ICD 1301 can be tracked anywhere in building 1302 and the MSW system can store interactions of ICD 1301 within vertical sliced geofences.

Figure 14:
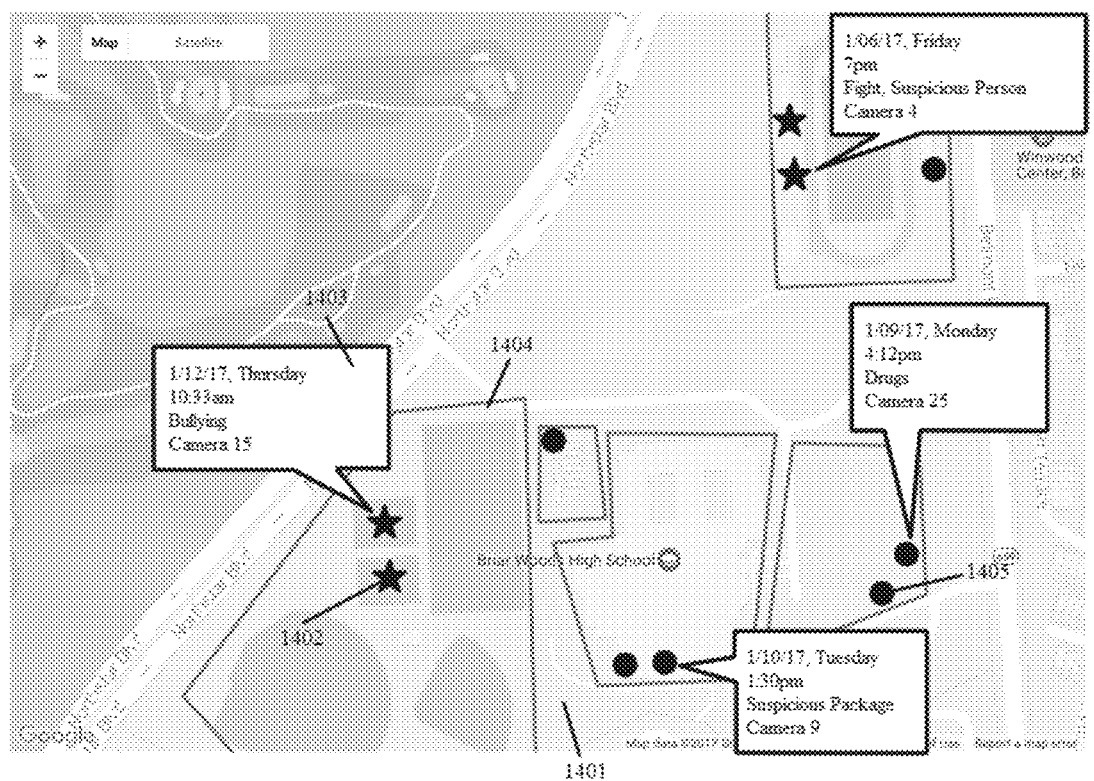
FIG. 14 is an illustration depicting a visual mapping of reported safety issues confirming when, where, type of safety issue reported and the security camera monitoring the area.

FIG. 14 is an illustration depicting a visual mapping of reported safety issues confirming when, where, type of safety issue reported and the security camera monitoring the area. Referring to FIG. 14 this MSW screenshot displays the visual mapping of reported safety issues 1401. The Athletic Fields geofence 1404 has two violent safety issues reported indicated by the star symbol 1402 and the text box 1403 gives the date, time, type violent safety issue and the security camera that monitors the area of geofence 1404. A nonviolent safety issue was reported indicated by the circle symbol 1405.

Figure 15:
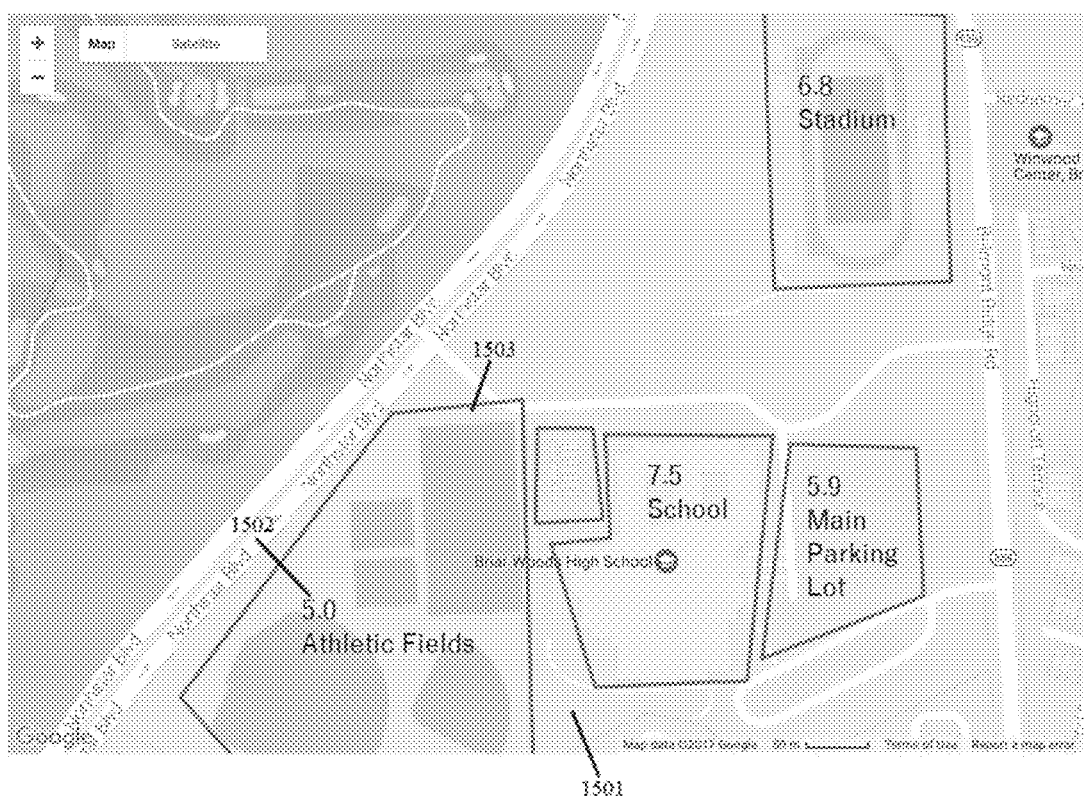
FIG. 15 is an illustration depicting an exemplary embodiment of a campus map view in MSW showing relative safety ratings for each geofenced area based on data provided by users and historical safety issues reported in each area.

FIG. 15 is an illustration depicting an exemplary embodiment of a campus map view in MSW showing relative safety ratings for each geofenced area based on data provided by users and historical safety issues reported in each area. Referring to FIG. 15 this MSW screenshot displays the visual mapping of relative safety ratings for multiple geofences 1501. The Athletic Fields geofence 1503 shows a relative 5.0 safety rating 1502 on a scale of 1 to 10, 10 being highest safety.

FIG. 16 is a table that shows how overall safety scores are calculated. Referring to FIG. 16 the calculation table 1601 displays the safety points from several factors that are used to calculate a current safety rating 1602.

FIG. 17 is a table that shows how credibility ratings are calculated for reported safety issues. Referring to FIG. 17 the calculation table 1701 displays the credibility points from several factors that are used to calculate a total credibility score 1702.

Figure 18:
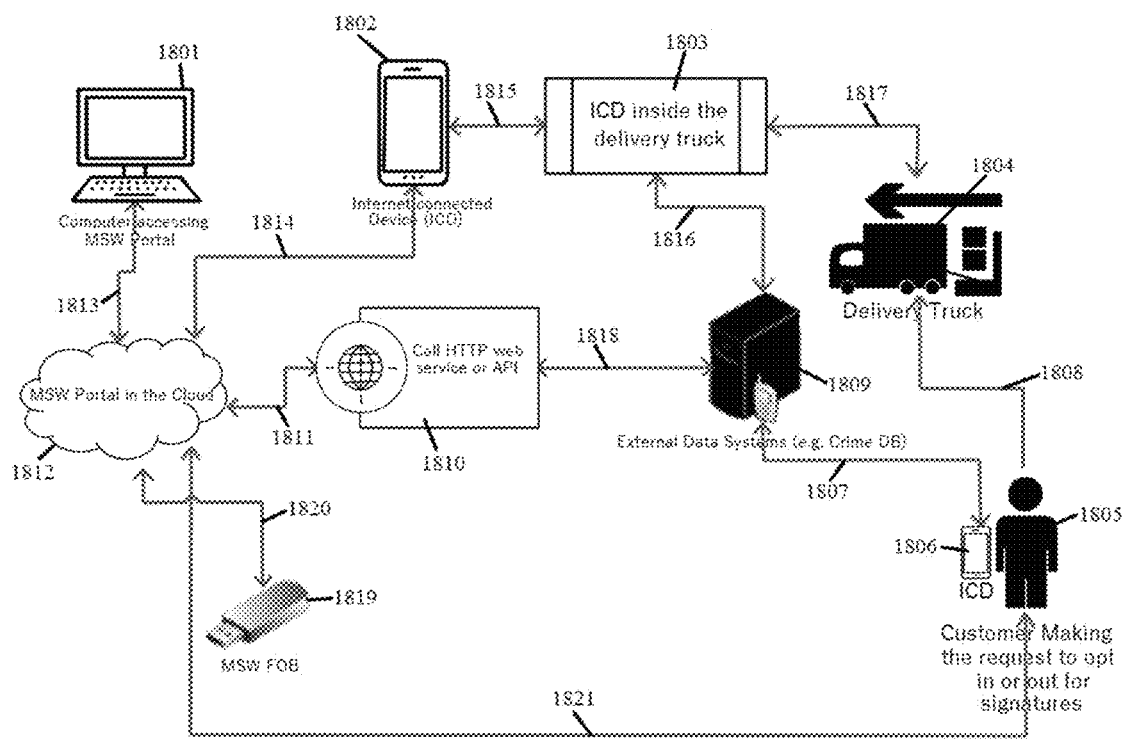
FIG. 18 is a schematic depicting interfaces between component parts of an embodiment of MSW to deliver signature required and non-signature required objects.

FIG. 18 is a schematic depicting interfaces between component parts of an embodiment of MSW to deliver signature required and non-signature required objects. Referring to FIG. 18, a MSW system 1812 for delivering a customer's notification and signature for delivering physical items and electronic items. The customer 1805 is notified by MSW system 1812 via communication line 1821 to the customer's ICD 1806 or FOB 1819 via communication line 1820 that a delivery vehicle 1804 is in route to their address. The delivery truck 1804 has an MSW ICD 1802 or FOB 1819 using a process 1803 that can communicate directly to an external data system for the delivery service 1809 via line 1816, 1817 and 1808. Delivery users can also manage their deliveries via a computer 1801 to access the external delivery system 1809 via communication line 1813 to MSW system 1812. Data is passed from the delivery truck ICD 1802, FOB 1819 and computer 1801 to the MSW portal system 1812 via communication lines 1814, 1820 and 1813 respectively. The delivery truck ICD 1802 communicates via line 1815 to the process job 1803 and from the process job follows line 1816 to the external delivery system 1809. The MSW portal system 1812 also has a direct link to external delivery system 1809 via a web service API 1810 vial communication line 1811. The delivery truck 1804 is able to notify the customer 1805 on their ICD 1806, FOB 1819 or computer 1801 if a delivery requires signature approval so that the customer 1805 will be able to send an electronic signature directly to the MSW system 1812 and to the external system 1809 which in turn notifies the delivery truck 1804 on their ICD 1802, FOB 1819 or computer 1801. The customer 1805 is also notified of a package even if it does not need signature approval so they are aware when it arrived. The customer 1805 is also notified when the delivery truck 1804 is within a specified distance away from their established delivery geofence that is stored in the MSW system 1812.

Figure 19:
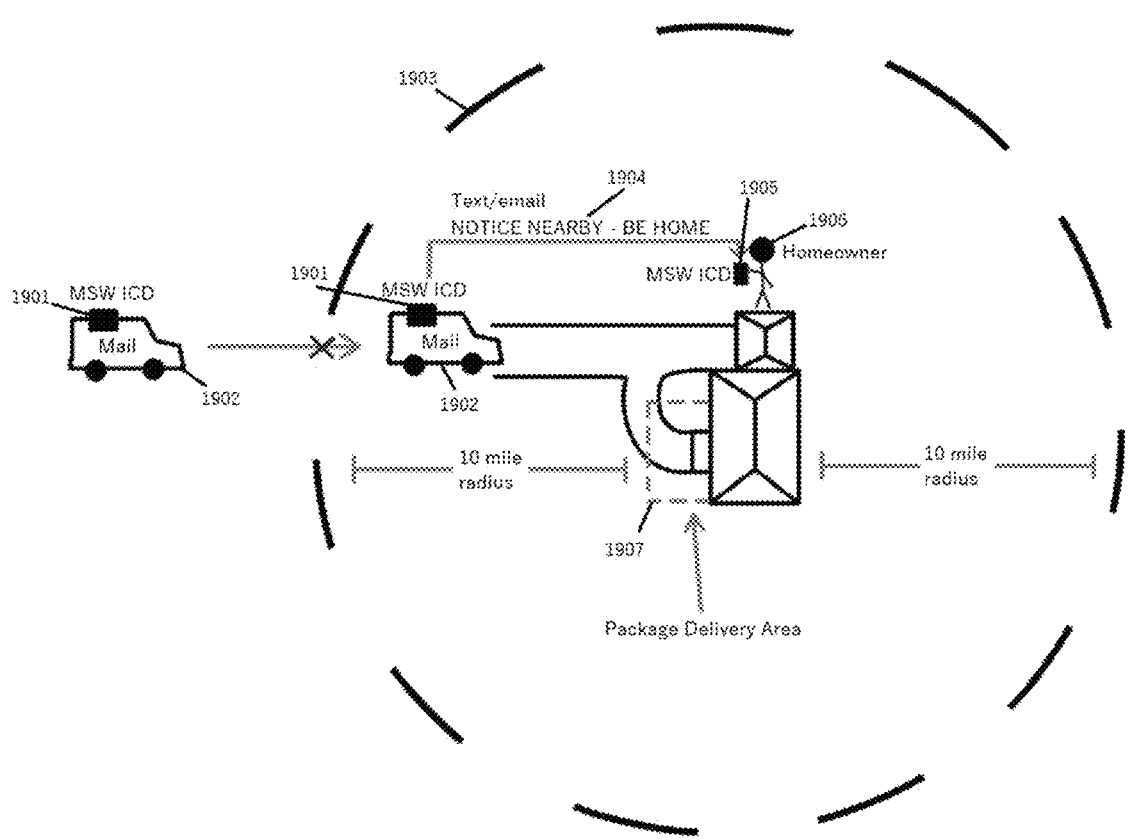
FIG. 19 is an illustration depicting the method for notifying property owners that a delivery is about to be made to a specified delivery zone on their property.

FIG. 19 is an illustration depicting the method for notifying property owners that a delivery is about to be made to a specified delivery zone on their property. Referring to FIG. 19 this illustration shows a mail delivery vehicle 1902 equipped with an ICD with the MSW app loaded and turned on 1901 entering a geofence 1903 that is within a specified distance from the property to receive a delivery in the package delivery geofence 1907. Once the mail delivery vehicle 1902 enters the geofence 1903, ICD 1901 sends a text/email notice 1904 to the property owner's ICD 1905 telling the property owner 1906 to be home to receive a delivery.

Figure 20:
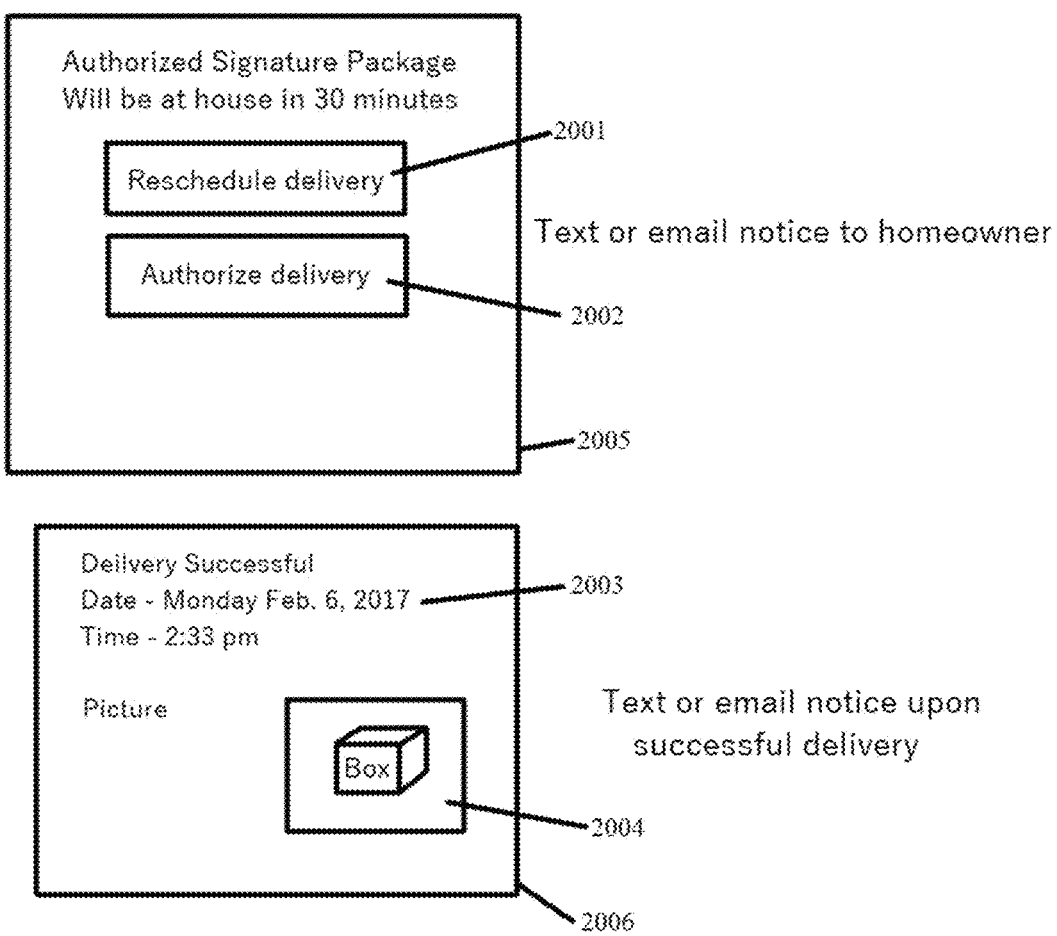
FIG. 20 is an illustration depicting the text/email notification to a property owner to reschedule or authorize a delivery, and the message confirming the condition of the object delivered.

FIG. 20 is an illustration depicting the text/email notification to a property owner to reschedule or authorize a delivery, and the message confirming the condition of the object delivered. Referring to FIG. 20 the illustration shows the text/email notification to the ICD of the property owner receiving a delivery 2005 to either push the reschedule delivery button 2001 or push the authorize delivery button 2002. Once the delivery is made to the package delivery geofence, the property owner receives a text/email notice to their ICD 2006 that confirms the date, time of delivery 2003 and a picture of the package 2004 that proves condition and location of the package delivered.

Figure 21:
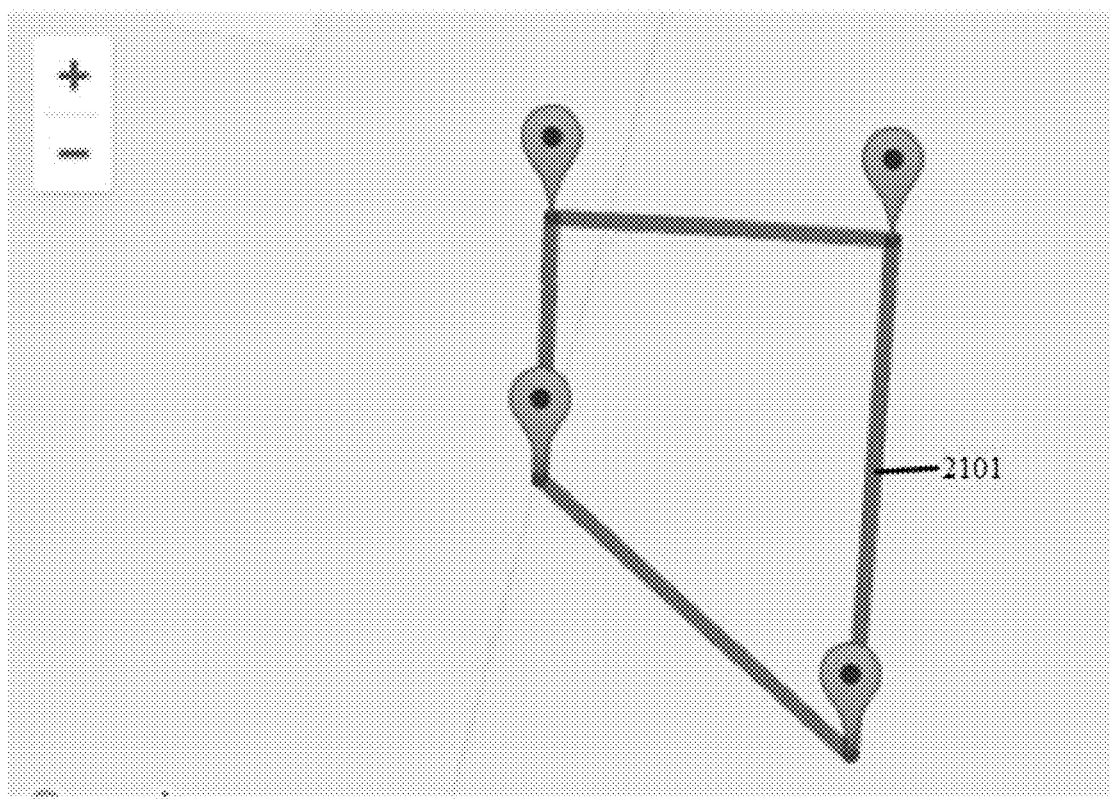
FIG. 21 is an illustration of an asymmetrical polygon geofence.

FIG. 21 is an illustration of an asymmetrical polygon geofence. Referring to FIG. 21 this MSW screenshot shows a four point closed geofence 2101.

Figure 22A:
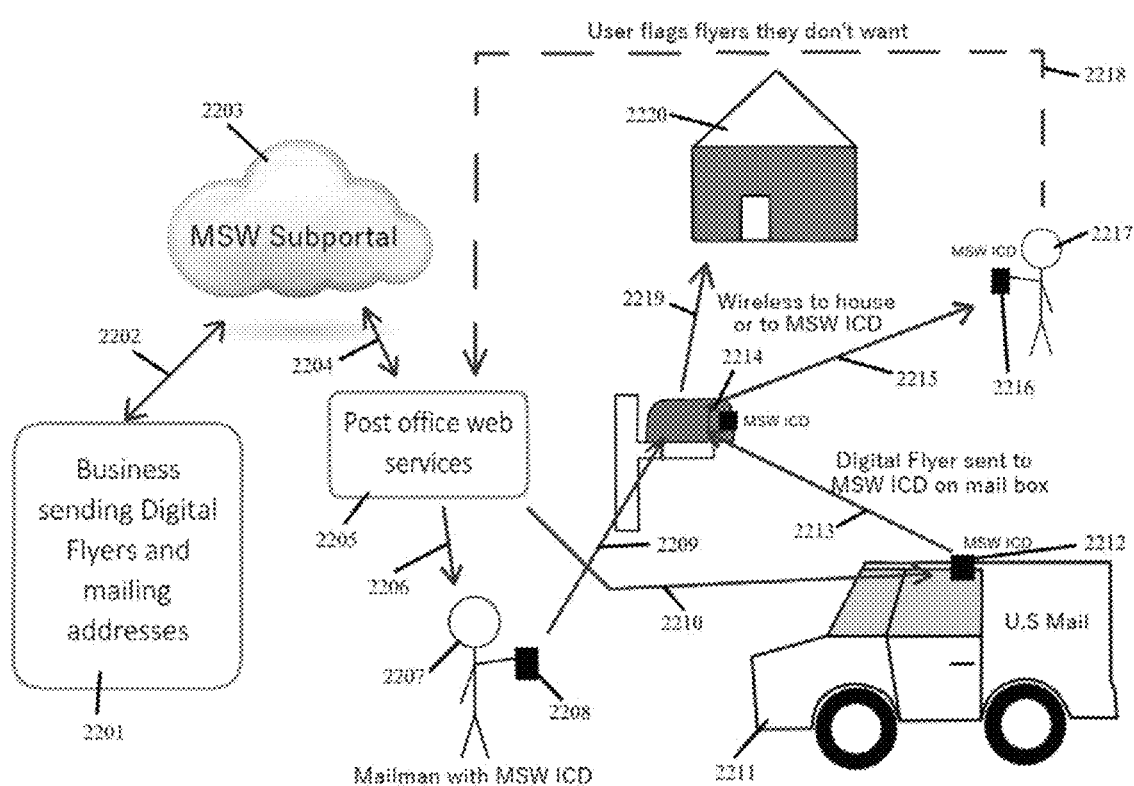
FIG. 22A is a schematic depicting interfaces between component parts of an embodiment of MSW to deliver digital materials and content to an internet connected "smart mailbox."

FIG. 22A is a schematic depicting interfaces between component parts of an embodiment of MSW to deliver digital materials and content to an internet connected "smart mailbox". Referring to FIG. 22A, an illustration that shows the US Mail truck 2211 that has installed the MSW FOB hardware 2212 and the mail person 2207 on foot using their ICD 2208 with the MSW app loaded that connects to post office web service 2205 via communication lines 2210 and 2206 respectively to pull down all the physical addresses that have digital flyers as provided by the MSW subportal system 2203 via communication line 2204. The MSW subportal system 2203 gets its data from businesses 2201 that create digital materials like promotional flyers via a communication line 2202. The MSW Subportal 2203 also has a mobile frontend for businesses 2201 who subscribe for such a digital content delivery system. When the mail person on foot 2207 or driving a mail truck 2211 gets within a specified range of the MSW smart mailbox 2214 (equipped with MSW ICD), the designated digital flyers from businesses 2201 transfer from the mail person's device 2208 via communication line 2209 and delivery vehicle device 2212 via communication line 2213 to the smart mailbox 2214. The customer 2217 then gets this business digital flyer 2201 on their ICD 2216 via communication line 2215 when they also get within the proximity of the smart mailbox 2214. The customer 2217 also has the option to opt out of future delivery of specific business digital flyers 2201 by notifying the postal web service 2204 via communication line 2218, and back to the MSW portal 2203 via communication line 2204. The smart mailbox 2214 also has the ability to communicate wirelessly to an MSW smart device in the house 2220 via line 2219. The device in the house is always connected to the internet via the houses Wi-Fi, and the device can share business digital flyers with customer 2217 on their ICD 2216. MSW Portal 2203 also does data analytics on customers 2217 who open the digital flyers so that it can be communicated back to the businesses 2201.

Figure 22B:
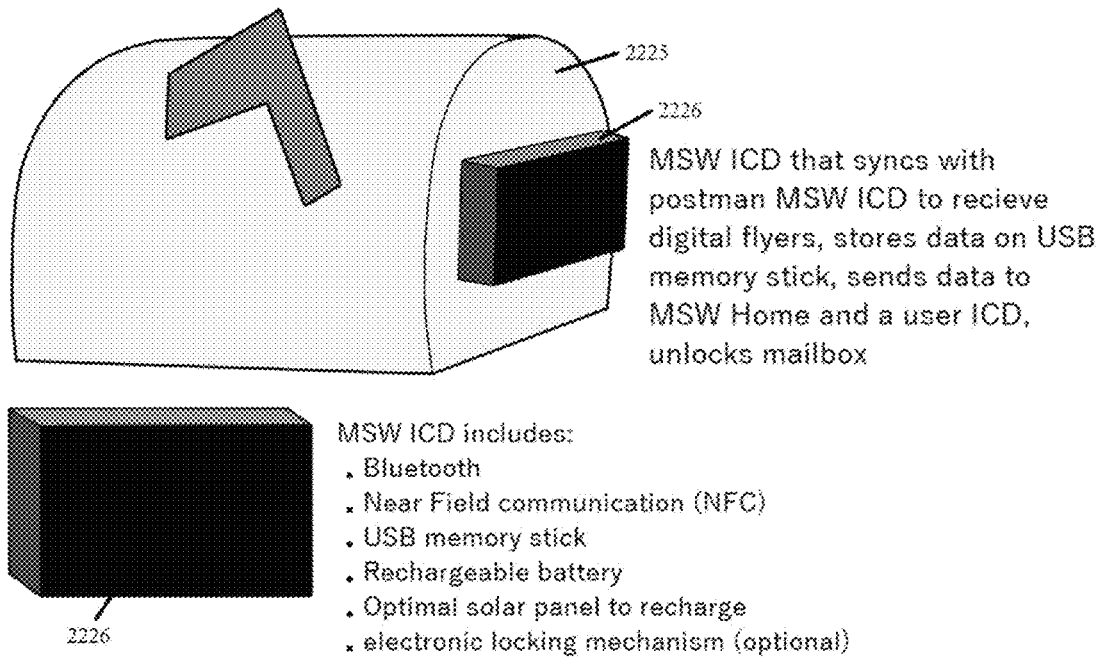
FIG. 22B is an illustration of the MSW smart mailbox.

FIG. 22B is an illustration of the MSW smart mailbox. Referring to FIG. 22B this illustration depicts a mailbox 2225 that has a MSW ICD mounted on the mailbox door 2226. The MSW ICD 2226 may be mounted inside or outside of the mailbox and the MSW ICD 2226 includes a rechargeable battery, USB memory stick, NFC, Bluetooth, electronic locking mechanism and solar recharging.

Figure 23:
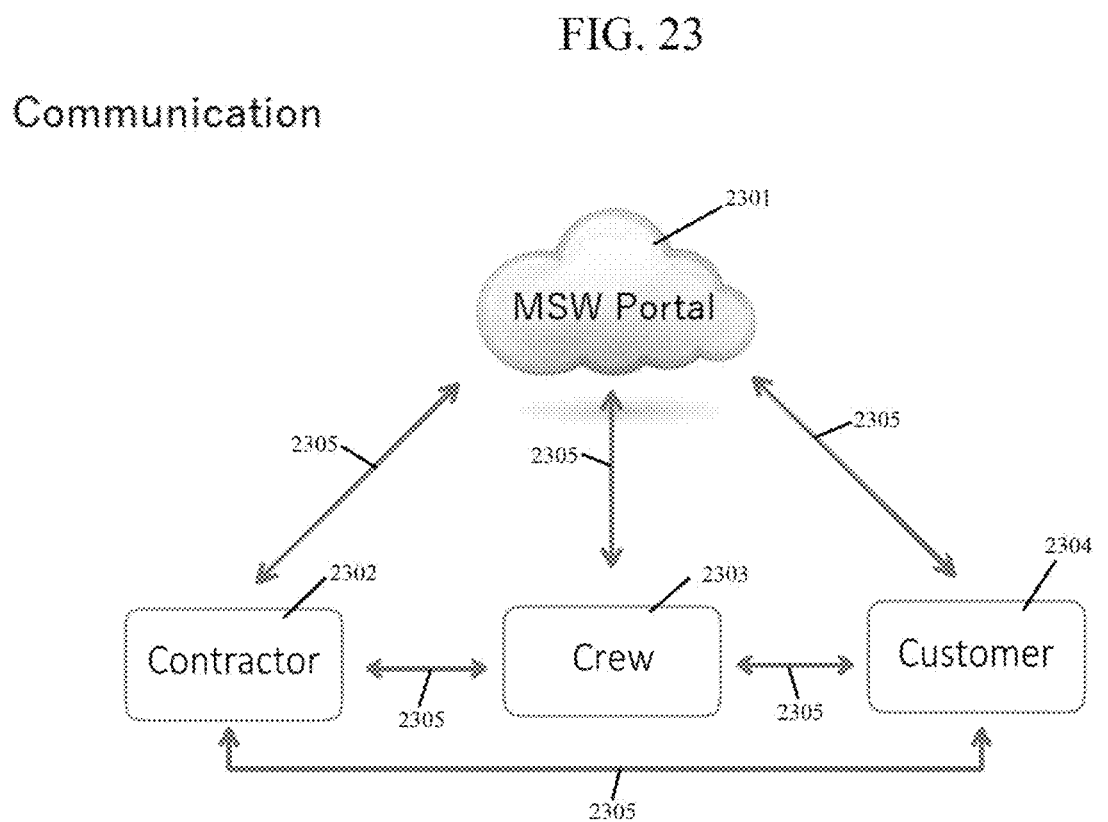
FIG. 23 is a schematic depicting interfaces between users of an embodiment of MSW for contractors and service providers to manage projects and people.

FIG. 23 is a schematic depicting interfaces between users of an embodiment of MSW for contractors and service providers to manage projects and people. Referring to FIG. 23 this illustration depicts the flow of 2-way communication 2305 between the MSW Portal 2301 with contractors 2302, crew members 2303 and customers 2304. Contractors 2302, crew members 2303 and customers 2304 also have 2-way communication 2305 through the MSW portal 2301 to each other.

Figure 24:
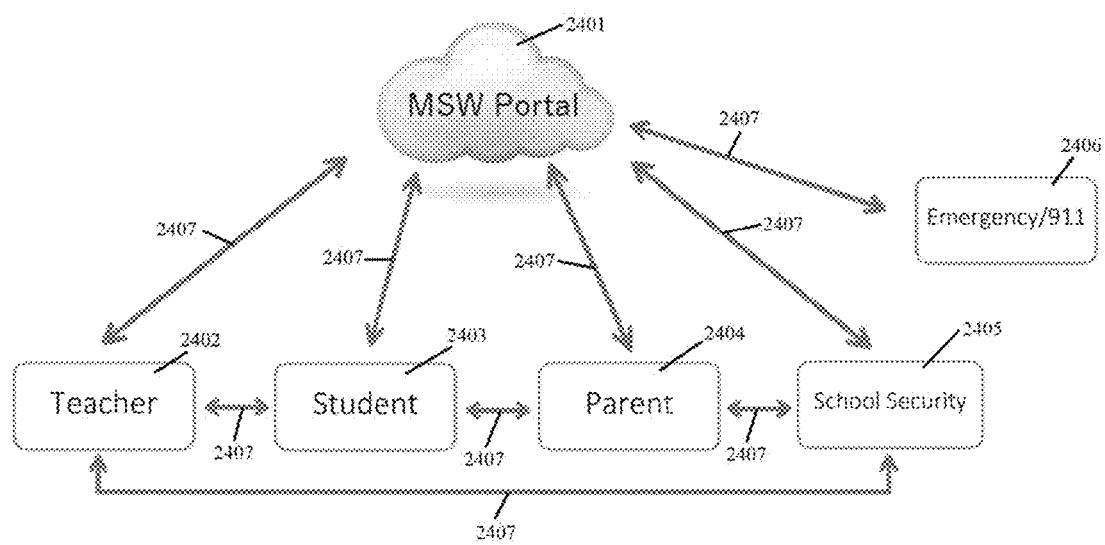
FIG. 24 is a schematic depicting interfaces between users of an embodiment of MSW for reporting safety issues.

FIG. 24 is a schematic depicting interfaces between users of an embodiment of MSW for reporting safety issues. Referring to FIG. 24 this illustration depicts the flow of 2-way communication 2407 between the MSW Portal 2401 with teachers 2402, students 2403, parents 2404, school security 2405 and emergency/911 personnel 2406. Teachers 2402, students 2403, parents 2404 and school security also have 2-way communication 2407 through the MSW portal 2401 to each other.

Figure 25:
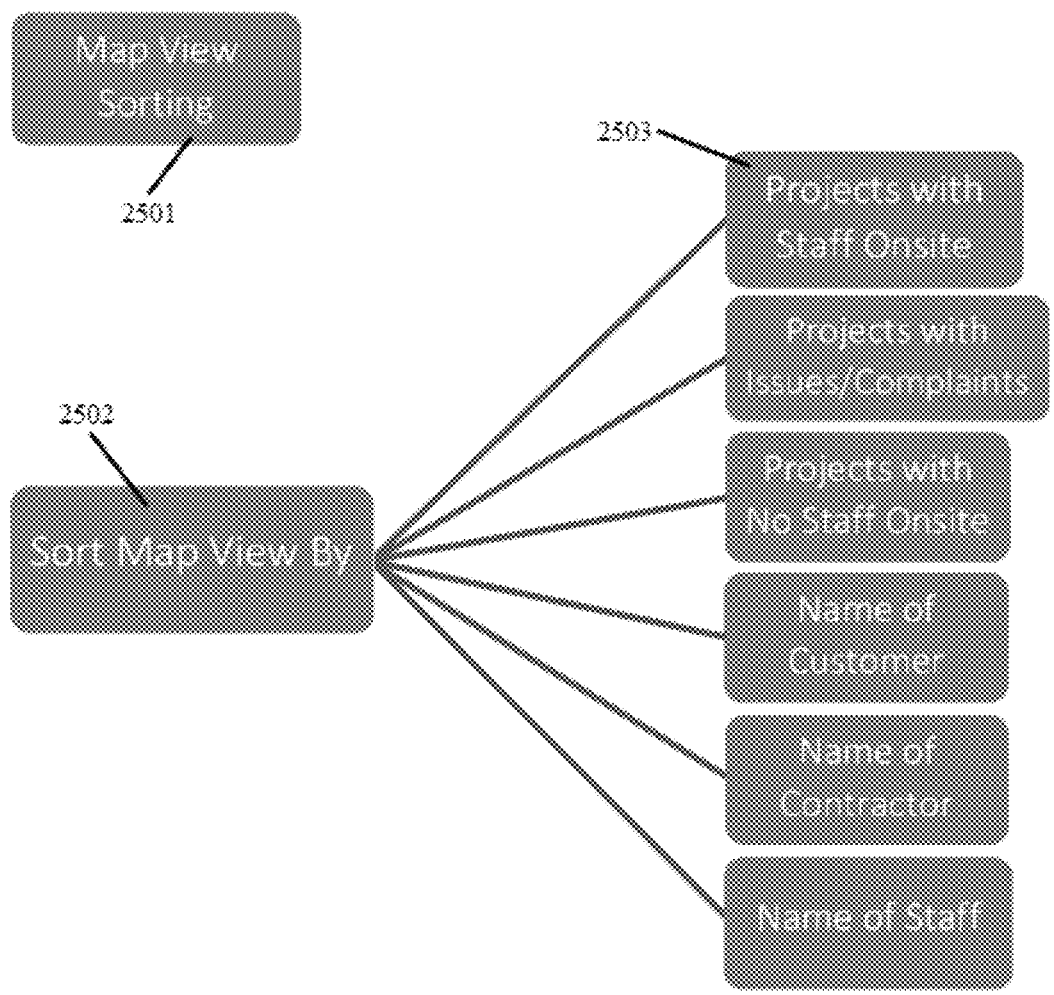
FIG. 25 is a schematic depicting interfaces between component parts of an embodiment of map view sorting in MSW.

FIG. 25 is a schematic depicting interfaces between component parts of an embodiment of map view sorting in MSW. Referring to FIG. 25, the map view has the option to filter what is viewed by using "map view sorting" 2501. Once "map view sorting" 2501 is selected, the menu takes a user to "sort map view by" 2502 and the menu allows users to select a variety of sorting tools 2503 to only view certain projects in map view.

Figure 26:
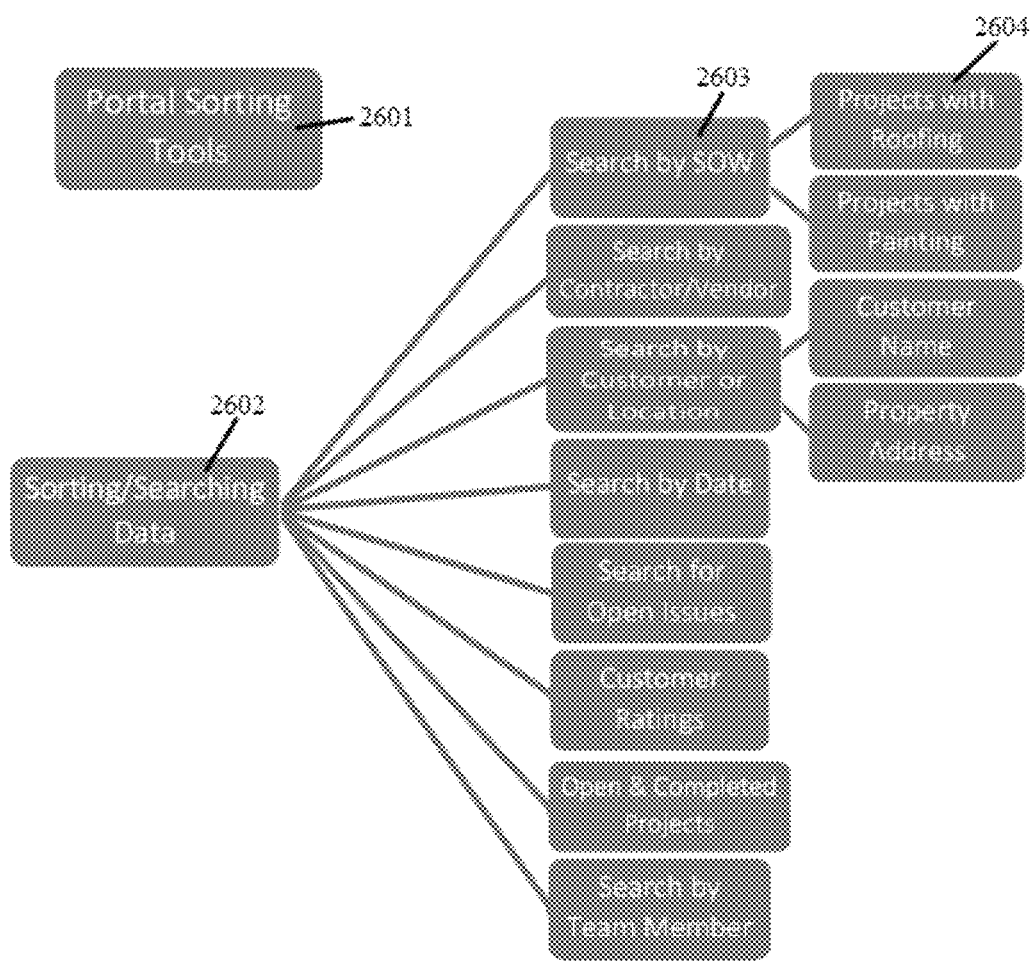
FIG. 26 is a schematic depicting interfaces between component parts of an embodiment of portal sorting tools in MSW.

FIG. 26 is a schematic depicting interfaces between component parts of an embodiment of portal sorting tools in MSW. Referring to FIG. 26, the "portal sorting tools" 2601 enable users to search archived data effectively. Once in "portal sorting tools" 2601, the menu takes a user to "sorting/searching data" 2602 and the menu allows users to select a variety of search data tools 2603 to find data of interest. Several search data tools 2603 will have additional search data tools 2604.

Figure 27:
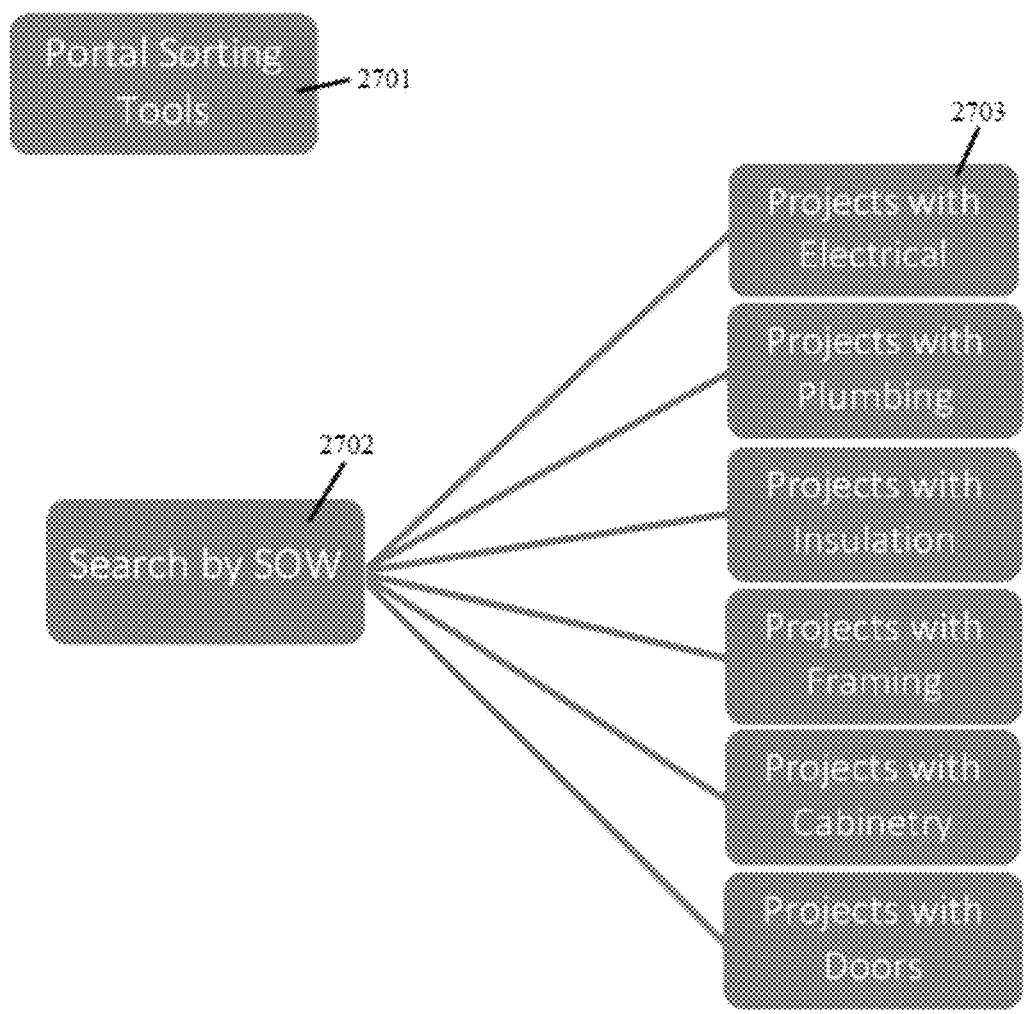
FIG. 27 is a schematic depicting interfaces between component parts of another embodiment of portal sorting tools in MSW to search by Scope Of Work.

FIG. 27 is a schematic depicting interfaces between component parts of another embodiment of portal sorting tools in MSW to search by Scope Of Work. Referring to FIG. 27, the "portal sorting tools" 2701 enables users to search archived data by scope of work "SOW" 2702. When a user searches by SOW 2702, the menu allows users to find projects that included a specific type of SOW such as electrical work 2703.

Figure 28:
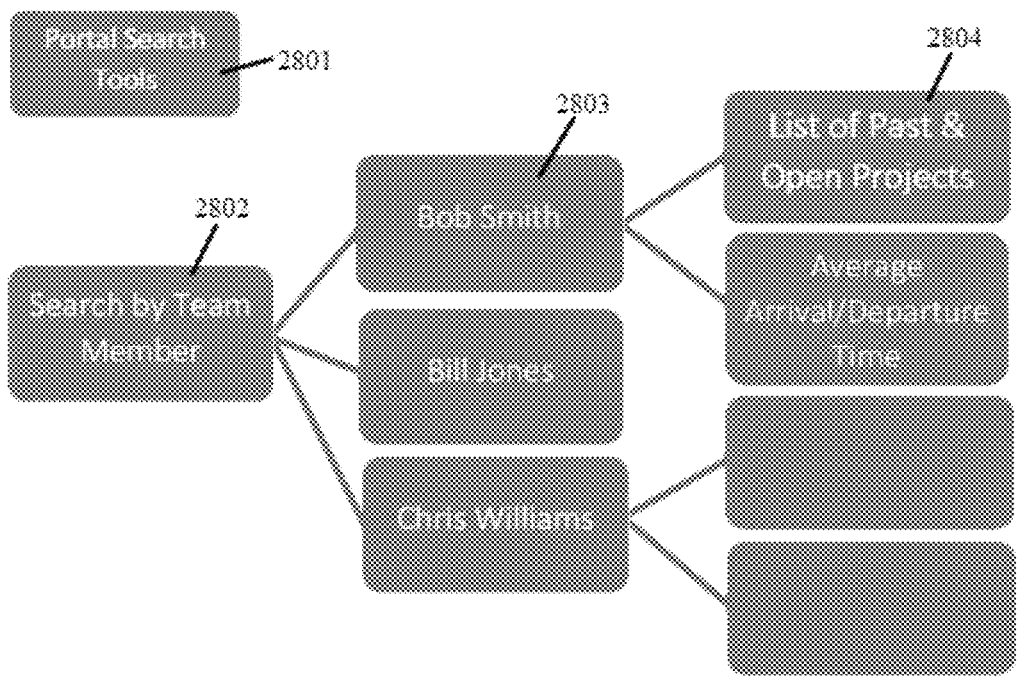
FIG. 28 is a schematic depicting interfaces between component parts of an embodiment of portal search tools in MSW to search by Team Member.

FIG. 28 is a schematic depicting interfaces between component parts of an embodiment of portal search tools in MSW to search by Team Member. Referring to FIG. 28, the "portal search tools" 2801 enables users to search archived data by team member 2802. When a user searches by team member 2802, the menu shows users all of the team member names on record 2803 and after clicking on a team member name 2803, the user will be able to access specific data on the team members past projects 2804 and other data relevant to that team member.

Figure 29:
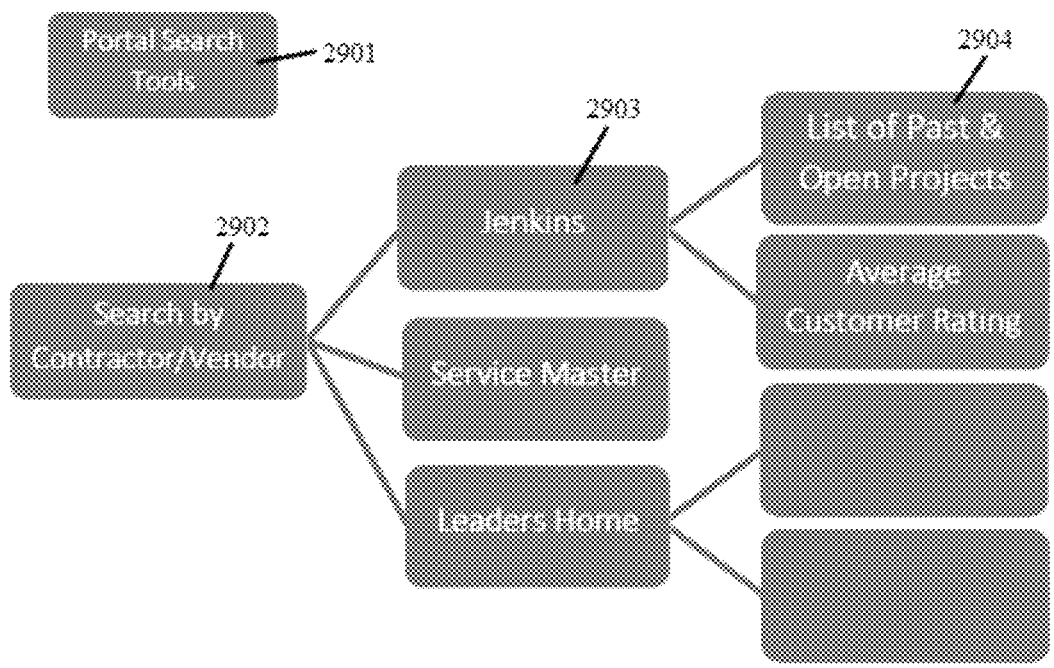
FIG. 29 is a schematic depicting interfaces between component parts of another embodiment of portal search tools in MSW to search by Contractor/Vendor.

FIG. 29 is a schematic depicting interfaces between component parts of another embodiment of portal search tools in MSW to search by Contractor/Vendor. Referring to FIG. 29, the "portal search tools" 2901 enables users to search archived data by contractor/vendor 2902. When a user searches by contractor/vendor 2902, the menu shows users all of the contractors/vendors on record 2903 and after clicking on a contractor/vendor 2903, the user will be able to access specific data on the contractor vendors past projects 2904 and other data relevant to that contractor/vendor.

Figure 30:
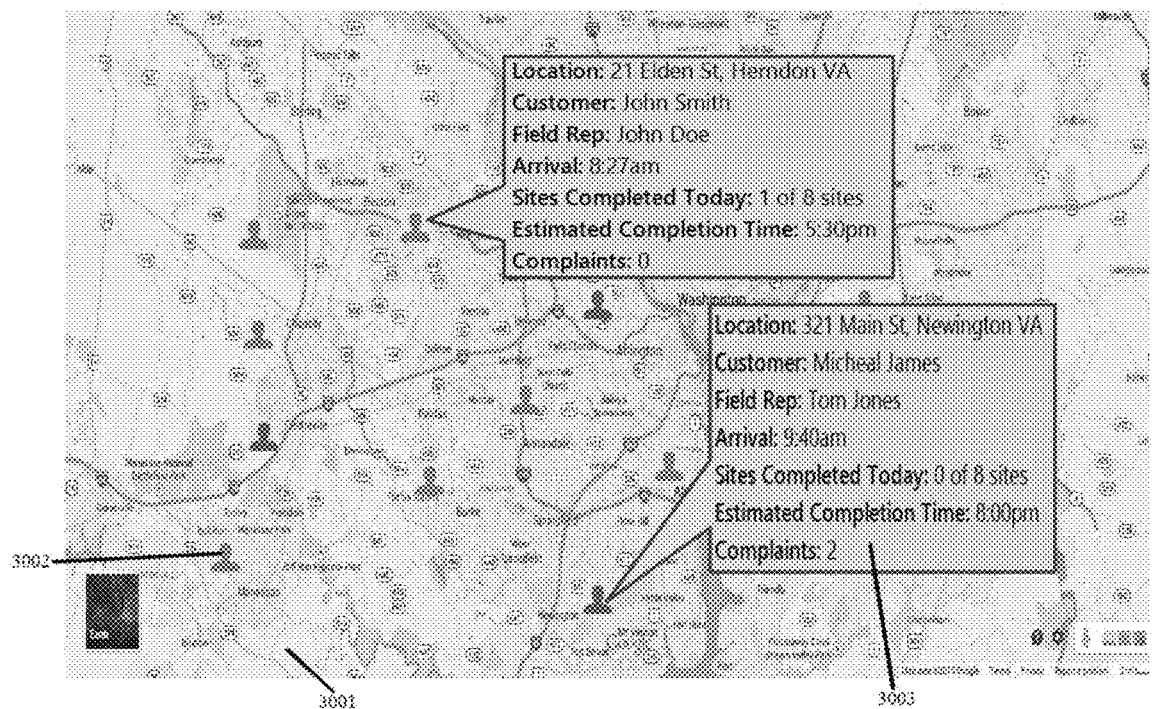
FIG. 30 is a screenshot depicting an exemplary embodiment of a map view in MSW.

FIG. 30 is a screenshot depicting an exemplary embodiment of a map view in MSW. Referring to FIG. 30, the map view 3001 displays a plurality of projects/properties being monitored 3002. When a user hovers or clicks on a project/property site, a text box displays details about the site such as address, customer name, staff onsite, complaints 3003.

FIGS. 31A & 31B are screenshots depicting exemplary embodiments of a project view in MSW. Referring to FIGS. 31A & 31B, the MSW screenshots 3101 and 3102 show how project details are captured and displayed for users.

Figure 32:
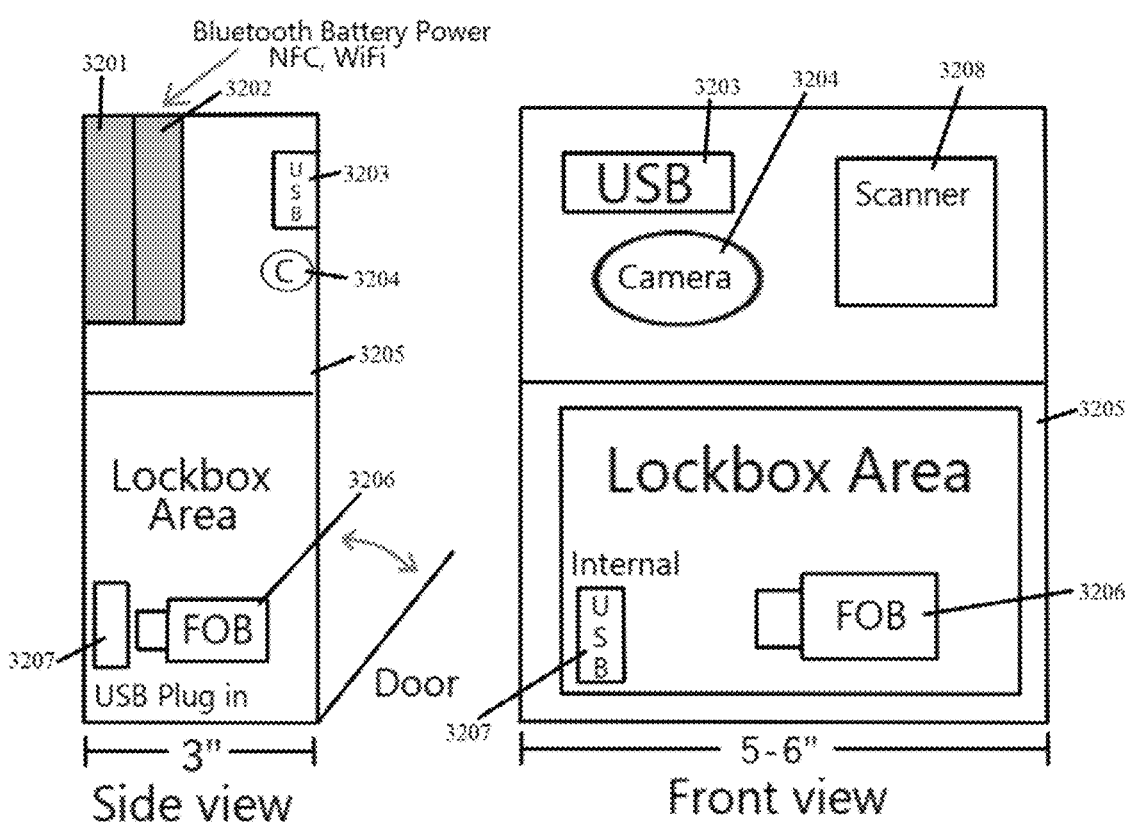
FIG. 32 is a side and front view illustration of an embodiment of a MSW smart lockbox to be used with the MSW FOB.

FIG. 32 is a side and front view illustration of an embodiment of a MSW smart lockbox to be used with the MSW FOB. Referring to FIG. 32, the illustration shows design features for the MSW smart lockbox 3205 that is used to safely keep the MSW FOB at a property so multiple service providers and vendors can access it onsite if they do not have an ICD with the MSW app loaded. The MSW smart lockbox 3205 includes a rechargeable battery 3202, Bluetooth/NFC/Wifi 3201, external accessible USB port 3203, internally accessible USB memory 3207, camera 3204, scanner 3208 and MSW FOB 3206. The external USB port 3203 allows users of the MSW FOB to transmit data to the internal USB memory 3207. The camera 3204 is used to take pictures of service providers and vendors using the MSW smart lockbox 3205, and the scanner 3208 is used to scan identification badges of service providers and vendors using the MSW smart lockbox 3205.

Figure 33:
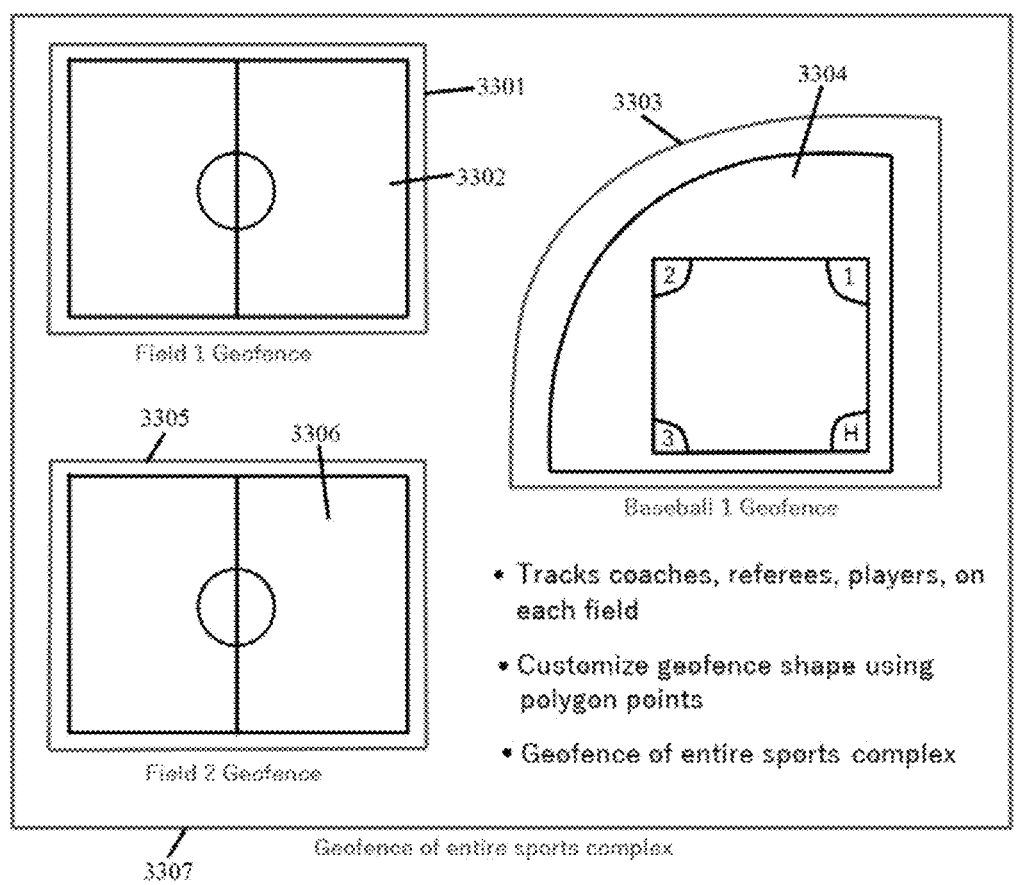
FIG. 33 is an illustration of an embodiment of MSW implemented in a recreational area such that each of a plurality of sports fields has its own polygon geofence.

FIG. 33 is an illustration of an embodiment of MSW implemented in a recreational area such that each of a plurality of sports fields has its own polygon geofence. Referring to FIG. 33 is an illustration showing how MSW can geofence the entirety of a recreational area 3307 and a plurality of individual sports fields for monitoring within its boundary. Field 1 3302 is geofenced 3301, Field 2 3306 is geofenced 3305, and a different shaped Baseball field 3304 is geofenced 3303. MSW is able to track coaches, referees and players on their respective ICDs that have the MSW app loaded and turned on.

Figure 34:
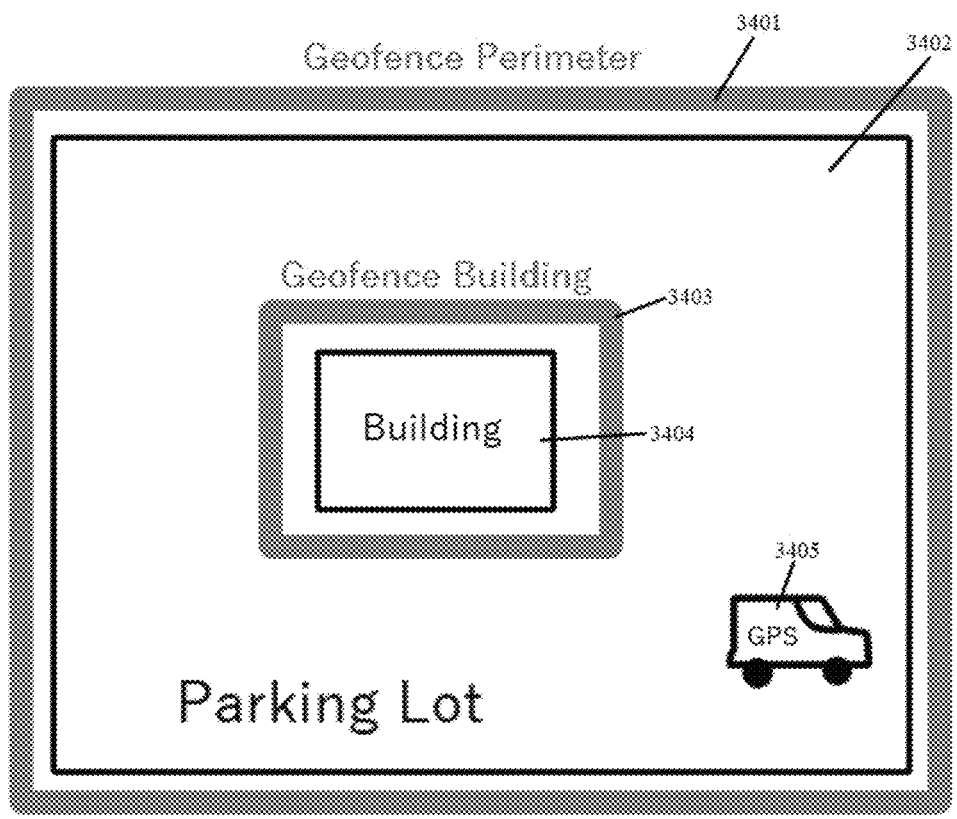
FIG. 34 is a top view of an embodiment of MSW having a geofenced perimeter and a separately geofenced building located entirely within the geofenced perimeter.

FIG. 34 is a top view of an embodiment of MSW having a geofenced perimeter and a separately geofenced building located entirely within the geofenced perimeter. Referring to FIG. 34 is an illustration of the limitations of the data from a GPS tracked vehicle 3405. The GPS tracked vehicle 3405 shows that it is in the area of the building 3404 where work needs to be completed; however, it does not confirm how many workers arrived in the vehicle, how many workers got out of the vehicle, how many workers actually go inside the building to work, how long the workers were inside the building and did the workers complete any work inside the building. When using the MSW app on a worker's ICD, the supervisor would see when the worker entered the parking lot geofence 3401, when the worker entered the building geofence 3403, pictures of the work completed inside the building 3404 and when the worker exited the building geofence 3403 and parking lot geofence 3401.

FIG. 35 is an illustration depicting a FOB mobile device according to an embodiment of MSW for users that do not have an ICD. Referring to FIG. 35 is an illustration of the MSW FOB 3507 for users that do not have an ICD with the MSW application loaded. The FOB 3507 is comprised of a clock in button 3501, clock out button 3502, speaker 3503, panic button 3504, camera button 3505, camera lens 3506 and USB port connector 3508 and internal memory and rechargeable battery. When a user arrives at a geofenced site, the user pushes the "clock in" button 3501 and begins the task to be completed. The user takes pictures of the work completed using the camera button 3505 and camera lens 3506 and then "clocks out" using the button 3502. If the user gets in an emergency situation, the user pushes the panic button 3504 and it sounds an alarm from the speaker 3502 to get the attention of others for help. The USB port connector 3508 enables the data stored on the FOB 3507 to be transmitted to an ICD with the MSW application loaded.

FIG. 36 is a table depicting how different tradesmen working the same project report the status of completion and estimated date/time of completion. Referring to FIG. 36 is a table showing the status of completion and estimated date/time of completion for a plurality of trades that are working the same project 3601. The table 3601 is viewed on an ICD with the MSW application loaded and the data improves scheduling crews to sites that are ready for their SOW to begin and to learn of SOW that is falling behind schedule.

The app allows a project manager to create a project geofence "work zone", the scope of work to be completed, the quantity of pictures to be taken at set time intervals throughout the day, assign crew members/workers to be monitored within the geofence work zone, and give permission for select picture categories that customers may see in the portal. The workers have a separate login and interface and can clock in and clock out using the app to capture the work hours they expect to be paid. The MSW app automatically tracks and verifies a person's time within a project geofence work zone they have been assigned to work. The app verifies that they are within the project geofence periodically. The period may be set by the manager. Workers may be required to upload progress photos periodically. Again, the period may be set by the manager; and, they/the manager(s) may be notified via text/email if the required photos have not been uploaded. Battery life and signal strength may be monitored to verify whether any loss of connection is due to battery drainage or weak signal. The combining of all these data elements from the ICD gives MSW the ability to accurately identify the most likely status of the worker.

Customers have their own login and interface and may view progress photos and notify the workers/manager via text/email if there appears to be a problem such as the wrong work being done.

Geofences may be polygonal with a user-selected number of vertices. A user may select to create a geofence around their present location, bringing up a satellite view of the area and allowing them to select the boundaries of the geofence on the screen. Depending on device capability, geofencing may include an altitude property, such that individual floors of buildings may be geofenced for monitoring. FIG. 7 is an illustration of an embodiment of MSW implemented in a building with a floor level work zone and a roof level work zone. In various exemplary embodiments, any number of floors in a building, including a number of levels greater than the two depicted in FIG. 7, are separately geofenced in MSW.

The way MSW uses the polygon is to allow the user to create a geofence "work zone" by clicking on multiple points to outline the designated area to be monitored as shown in FIG. 21. An unlimited number of polygon points may be used to create a geofence "work zone".

Pictures and related data may be encrypted and stored locally within the app itself and not on the ICD. This prevents MSW app users from sharing pictures and related data captured by the MSW app with other people, social media or other systems. When data from the MSW app is uploaded to the MSW cloud, the data is then cleared from within the MSW app on the user's ICD. The address where pictures are taken can be verified by GPS contemporaneously, as can the time the photo is taken.

Workers may be assigned to various tasks within a project and the days and hours when workers are expected to be working on the project may be set at the project, task, and individual level. Uploaded pictures may be categorized by the task they are associated with and managers/customers may filter and search images by category. For instance, a manager may require workers to submit pictures of insulation and plumbing installed, and workers would submit insulation pictures under the insulation category and plumbing pictures under the plumbing category. The MSW app may have workers update the completion percentage of tasks at regular intervals, such as when photos are taken, and tasks may be marked completed and workers automatically or manually assigned to new tasks. For instance, the MSW app can send a message to workers at a set time each day to ask the status of work completed and the date/time the workers expect to complete the scope of work.

The app can be white-labeled by each company user with its brand/logo. The app interface in the online portal and on the ICD may show the company user brand/logo. The company user may give the app with their brand/logo to their end customers and the customer interface will have the same branding.

The app can push collected data out and pull data in from other databases, platforms and systems by any available methods including but not limited to APIs and CSV files. For instance, the MSW app can send working hour information to common apps for payroll, accounting and can import payroll data from such systems in order to audit the payroll data against the MSW app's time records.

The app enables a manager to view all current project geofenced work zones on a map and filter the projects shown by various attributes such as projects with workers onsite, projects with reported problems, etc. and can use color-codes and symbols shown on the map in various ways (e.g. red for problem reported, green for worker onsite, yellow for pending). FIG. 30 is a screen shot depicting an exemplary black and white embodiment of a map view in MSW.

The app allows managers to set when they receive notifications that a situation exists that need their attention. For example, the app can notify a manager if a worker is not at the project site when they are supposed to be, if no workers are present onsite when the project is supposed to be active, if a worker leaves the geofence area, if a problem is reported by a customer, etc. The app solves the problem of managers not knowing what their workers are doing in multiple locations.

The app can also integrate other GPS applications such as tracking vehicle mileage, location, gas usage, etc.

In an alternative embodiment utilized as a mobile site watch, one or more of the following features are incorporated with one or more of the foregoing features. There is a problem that the insurance industry, contractors, service providers, homeowners, and many others are routinely charged for scope of work (SOW) not completed or for hours not worked. They do not have visibility into multiple project sites or a way to document work was done properly. Current challenges include the following: Crews show up late, leave early and expect full payment; there is no documentation to prove the condition of a building project at any time; there are no standards or consistent approach to documenting SOW done properly; and there is no long term storage of project data or ability to retrieve data. Various embodiments include one or more of the following to solve one or more of the foregoing problems: utilize mobile app technology to track all crew activities and SOW completion and to document the condition of the building in a consistent, standardized way to prevent overcharges and avoid blame for damage not done by crew.

Various embodiments include one or more of the following: a mobile app compatible with Android Phones/Tablets, iPhone, iPad, etc.; open API; GPS tracking of movement of crews inside/outside a geofence; pictures taken at varied intervals such as by hour(s); a person onsite/offsite and pictures all to be time/GPS stamped and immediately uploaded automatically from an ICD to the MSW cloud database; picture categories so that one can sort pictures quickly in database; a customer satisfaction survey of task/service performed; voice messages of a length such as two minutes from project admin to crew; send/share distribution of project data to team members with a single click; team members/customers only get permission to view certain data and use certain buttons based on project manager or crew level; issue/problem pictures from crew/customer automatically alert project manager/company to look at picture(s) and call crew/customer; allow voice message (such as two minute length) link with issue/problem pictures to explain the situation; send updates to SOW from project manager, and thereby trigger auto alert to crew to check on update, again allowing voice message (such as two minute length); use of secure, encrypted servers. The MSW portal application is tied to hardware such as the FOB (see FIG. 35) and Smart Lockbox (see FIG. 32) that is also used by users who do not have an ICD. The FOB has the embedded version of MSW application.

Some embodiments include a back office portal, including one or more of the following: a global pushpin map that shows every active user, using different colors and symbols (e.g. red means not onsite when should be, green means onsite when should be, etc.; a global pushpin map that shows all project sites being currently watched (blue pushpin); hover/click push pin to get key project stats like data completeness, contractor name, project manager phone/email, estimated project completion date); click on any pin and go directly into project folder to see pictures, etc.; auditing tools for insurance carriers, find highly rated and poorly rated contractors, customer satisfaction scores, project archives, time sheet fraud detection (see FIG. 12), issue/damage pictures submitted by customer; contractor can see when team member picks up and reads SOW info, changes to SOW, etc.; time stamp on ALL data clicks on MSW; auto-invoicing customer when task/service/project completed and submitted into storage.

The Time Sheet Fraud Detection stated above is achieved by comparing the automatic time keeping within a specified polygon geofence with the time keeping system of an external system (see FIG. 12). This comparison is done via an API based integration.

Some embodiments of the back office portal additionally include one or more of the following: monthly company user fee auto-invoiced/billed to card on file based on number of team members on list anytime during the month; analytic tools, for all crew members track all projects associated with (open/closed projects), how many hours on each project, day to day arrival/departure times for each project.

Various embodiments additionally include one or more of the following: help to track Change Order hours to support Change Order billing to customer; and a project timeline/gannt chart for work being completed. Workers are asked by MSW at predetermined intervals and/or times such as two times per day (e.g. noon and end of day) the percentage of completion of SOW and expected date/time for 100% completion. Completion times are put on a project timeline so that sub-contractors know when to schedule their crews to be onsite and to leave for the next project. The ICD such as the MSW FOB or smart phone provide the interface where the user can enter the percentage completed data. The percentage completed numbers are programmed on the MSW portal backend to be entered in a field for the ICD or by number of clicks on a specific button on the FOB. The intervals between clicks on the FOB is configurable on the MSW Portal in the cloud.

Service Providers/Contractors/Crew Members/Customers all have their own username and a passcode to the MSW portal when they download the application. Everyone works off the project number to make sure SOW docs, site pictures, and GPS/Geofence data all go to the correct project. All features are available in English and Spanish options, or other language as needed.

Various embodiments include certain system components and features such as one or more of the following: ICD, ICD with a camera; downloaded MSW application; secure servers such as through Amazon; MSW portal for all users to login; security features of MSW; commercial grade encrypted Amazon servers; company control of their list of approved users; when company removes a user, MSW immediately stops user access to MSW portal; data submitted to the MSW server cannot be accessed or deleted by unauthorized team users; all data submitted is time stamped and GPS location stamped; when the project is submitted as completed by the team, the team cannot change the project file, becomes "read only"; company MSW administrator controls what project data that each user can access and use; users that have not been assigned to the team by the project originator cannot use the project number/customer name to gain access to the project data, rather, that access is blocked by MSW so that unauthorized individuals cannot upload pictures, see SOW, etc.; and pictures taken and data collected are encrypted and stored within the app and not stored on the ICD; an encrypted data/pictures are deleted from the app on the ICD as soon as they are transmitted to the MSW cloud server (HIPPA compliant). The MSW role based security model creates a complete logical separation of all data elements and their permissions. MSW also utilizes industry standard 256 bit encryption using various protocols stated below.

Accordingly, FIG. 1 is a schematic depicting interfaces between component parts of an embodiment of MSW for tracking the activity within a polygon geofenced area. In this embodiment, a mobile user has a mobile device. Encrypted communications pass from the mobile device to the cloud. In various embodiments, the cloud transmits data using TLS 1.2 SSL and other secure protocols (Internet Key Exchange, IPsec., Kerberos, Point to Point Protocol, Signal Protocol, Transport Layer Security, ZRTP, etc.). Within the cloud or on hardware locked servers, an MSW private cloud sends these encrypted communications to customer private cloud server(s). The customer private cloud server(s) also receive encrypted communications from a laptop or other ICD in use by a supervisor. This supervisor's ICD receives encrypted communications from the MSW private cloud and inputs by the supervisor. The supervisor may utilize a variety of mobile ICDs to interact with the MSW system in addition to or as a substitute for the laptop/PC.

In various embodiments, MSW helps the insurance underwriter by one or more of the following: underwriters are not able to control risk of losses due to a lack of current data on the property and content to be insured and that leads to higher risk and higher premiums for policyholders; MSW provides direct help to underwriters by allowing policyholders to do some of the property documentation and submit that to them; enables a "continuous policy" approach with no renewal period; policyholder submits pictures of the content and condition of their property periodically, such as every 6 months, and the underwriter adjusts their insurance premiums up/down accordingly.

Various embodiments include one or more of the following functions: know when workers are within a Geofence onsite/offsite to support payroll; categorized pictures that are time stamped/gps stamped to confirm SOW progress and quality of work done within the designated Geofence work zone; ability to remotely see and review uploaded SOW pictures; project completion timeline based on percentage completion and date/time expected to be done. See FIG. 36.

Various embodiments are implemented such that any company doing project or service related work may utilize the invention. Such companies include, for example, those in professional trades such as electrical, plumbing, mechanical, etc.; renovation, remodeling, construction; landscaping and lawn service; delivery service, including parcel and mail delivery; maintenance service and repair; auto, HVAC, appliances; insurance claims and underwriting work; banks, such as with construction loans to support draw payments; home health care; moving and storage; painting; pest/termite control service; charitable organizations; rental property owners and management companies; and coach/referee coordinators.

Certain embodiments of MSW pertain to a home/property owner. These may include one or more of the following: track all service, maintenance, repair providers that work on the property. A homeowner signs up the property on MSW and all service providers are data collectors for them. When they sell the house, MSW account can transfer all records to the buyer and be continued. Such embodiments may further include one or more of the following: securely keep insurance video of home and contents to protect against future claims of loss being rejected by insurance carriers; always know when any service providers are on property and whether they are doing work properly that the homeowner is paying them to do; archive all maintenance/repair/renovation records in the cloud so to be able to prove how well maintained the property has been when selling; insurance loss history, etc.; submit pictures to insurance underwriter to ensure proper premium rates are assessed; protect against paying for work not completed; keep track of elderly care for family members living in another home not convenient to get to; keep track of rental property and service providers doing work there; keep track of house/pet sitters taking care of house when not in town; know how long it takes a service provider to do the service in order to validate the accuracy of invoices to be paid.

Various embodiments of the MSW portal are designed to be professional versions. Such embodiments may include one or more of the following features: a dashboard designed for MSW Pro users; show number of current open projects; show the number of current team members; show a list of project names that will be 100% completed by a certain date based on estimates submitted by team members in certain embodiments; show total "onsite" and "offsite" hours for workers for a period of time such as the last 7 days; and show total "material receipts" submitted for a period of time such as the last 7 days.

Various embodiments include one or more of the following features for team members: sections to show their name, address, Email, phone, company name, edit, delete, ability to click on email address to send email out to them; "Notes" section in team member profile; insurance info for subcontractors; and an "add" button in portal to add team members using a desktop, not just ICD.

Various embodiments include one or more of the following features for customers: sections to show their name, address, Email, phone, % completed, status active/inactive, edit, delete, ability to click on email address to send email out to customer; add "Notes" section in customer profile; and an add button in portal to add customers using a desktop, not just an ICD.

As shown in FIG. 31A and FIG. 31B, various embodiments include one or more of the following features for displaying project information: sections to show project name/number, percentage completed, estimated end date, customer name, start date, total labor hours onsite/offsite, assigned team members, value of contract; SOW category name, submitted by, updated date/time, SOW/contract documents uploaded, SOW edit, SOW category images.

Accordingly, FIG. 25 to FIG. 29 are schematics depicting interfaces between component parts of an embodiment of portal sorting tools in MSW. For instance, when the user selects "Search by SOW" on the interface of the embodiment depicted in FIG. 27, the user will be provided access to various trades that perform different SOW like electrical, plumbing and framing.

Various embodiments include an isolated place for various trades on the same project to log in and see estimated completion dates chart for all trades. Some embodiments include a tab for Project SOW Completion.

As shown in FIG. 30, various embodiments include a Project Map View having one or more of the following: default to showing the state of the account holder; push pins show each site registered by account to be watched; push pin colors to be different such as red for a site with a customer complaint, green for a site with at least one team member currently onsite, black for a site with no team members currently onsite; hovering over or clicking on a push pin reveals one or more of customer name, address, phone, project manager, estimated completion date/time, percentage completed, number of team members currently onsite, customer complaints submitted. Data in MSW is captured through multiple channels such as the MSW FOB, ICD/s and all of the available sensor data from an ICD and other IoT devices available. All the captured data is persisted in the MSW database that is then accessed/visualized through the MSW portal that predominantly resides on the cloud servers. The MSW Portal also includes a dynamic dashboard that visualizes the data through different charts to show the admins metrics such as number of project completed; percentage attendance by various staff members; Average signal strength from different ICD's, etc.

Various embodiments include a map view of school/public space geofence(s) with safety ratings and reported safety issues having one or more of the following: default to showing the state of the account holder; push pins show each site registered by the account holder to be watched; geofenced zone(s) outlined in different colors; different symbols and colors within geofenced zone(s) to show where people report a safety issue such as red for violent safety issue reported, yellow for non-violent safety issue reported; hovering over or clicking on a geofence reveals content of safety issues reported within the geofence and relative safety rating for the geofence; details of a safety issue reported may include person reporting name, address, phone, date/time/geolocation of safety issue, video/audio clip of safety issue, text/email of details of safety issue, and other relevant information. See FIGS. 14, 15.

Various embodiments include one or more of the following features for project managers: Project Manager list columns to show one or more of person name, company name, email, phone, status, Team Members (View), delete (remove username column); team member list columns to show one or more of name, company name, email, phone, assigned projects (view, show list of projects), attendance (view, show calendar with worker hours onsite on each date, click a date to see worker onsite hours per project worked that date).

Various embodiments include one or more of the following features for payroll: columns to show one or more of Name, Onsite Hours for a period such as the last 7 days, Offsite Hours for a period such as the last 7 days, Number of Projects Assigned, Attendance (view calendar that shows hours onsite on each date, click a date to see onsite hours per project worked that date).

Various embodiments include one or more of the following features for an SOW Picture Categories Tab: Columns to show one or more of SOW Picture Categories, Actions (edit/delete), Add New Category button. Some embodiments are able to create a grouping of SOW pictures such as those that are routinely needed. For instance, if a company only does painting which requires 7 steps from set up to clean up, an embodiment could be able to set up MSW to only click on painting and all 7 steps are captured. MSW allows for the unique multilevel hierarchical category system. There are industry wide top level categories that allow each individual organization to create sub categories to these top level categories, and to create new top level categories that are unique to their organization. MSW allows administrators of each organization to set the permissions for each category and to assign the categories and sub categories to be available for each specific project. MSW also allows for organization admins to give viewing and editing permissions to one or more categories to their customers.

Various embodiments include one or more of the following features for an MSW Portal for Home Version(s): a Dashboard Tab showing the number of sites being watched, show number of service providers being watched, show list of service providers onsite during a period such as the last 7 days, including columns for one or more of name, date, time arrived, time departed, pictures submitted; a Team Members Tab (people/service providers allowed on property) including columns to show one or more of Name, Company Name, Email, Phone, Edit, Delete (ability to click on email address to send email out to them); Notes section in team member profile; Add button in portal to add team members using a desktop, not just a phone.

Various embodiments include one or more of the following features for a Property Tab: columns to show one or more of property name, address, point of contact name/phone, Team Members Assigned (view, shows list of service providers for site), delete; Service Providers List columns to show one or more of Company name, SOW Instructions, SOW/Contract documents uploaded (view), SOW Edit, Attendance (view, show calendar with hours onsite on each date, click a date to see onsite hours for service providers that worked that date), SOW Category Images Various embodiments include one or more of the following features for a SOW Picture Categories Tab: columns to show one or more of SOW Categories, Actions (edit/delete), ADD New Category button.

Various embodiments include one or more of the following features for Home Health Care: Track mileage of staff; Panic button for staff to alert manager of a safety issue; staff sign out at end of day, create customized list of medical/non-medical pictures; integration with Electronic Medical Records (EMR). MSW tracks mileage through integration with applications such as Google Maps API, WAZE API, Apple Maps API, and other mapping software. The integration with this API also allows MSW to calculate optimum routes based on traffic and also distance.

Various embodiments include one or more of the following features for School/University Safety and Public/Private Venue Safety: Polygon Geofence various areas of the campus or public/private venue (stadium, parking lot, school, airport, metro station, national park, government facility . . . ), student/teacher/parent/public periodic survey to assess safety of each geofenced area and score relative safety of each geofenced area on campus/public space, map of campus/public/private space showing safety score, color coded areas based on safety score, one click icons to report the time and location of a variety of safety issues to school/public security/police (e.g. fire, bullying, weapons, suspicious person/package, drugs, violence . . . ), map showing various colored pushpins and symbols for the time and location of reported safety issues on campus/public/private venue, integration with school/university/911 security systems, push notifications to students/teachers/parents/public of any safety concerns in close proximity (e.g. terrorist attack on campus and where it is occurring), able to take/submit encrypted picture, video and audio to security/police, gamification for users to earn points when they use the app and the ability to redeem points for items of value, push notifications from users to other users within close proximity or within the same polygon geofence to alert others to a nearby safety concern, credibility rating for safety reports submitted by users, credibility rating for users (e.g. teacher has a higher baseline credibility score than a student baseline credibility score). MSW creates a unique parameter within the portal system that allows for the weighting of different factors to calculate a credibility score. See FIG. 17. This parameter is sent to the ICD's and FOB's associated with a user group that is associated with a higher baseline credibility score. The purpose of a weighted credibility score is to help first responders understand how credible a potential safety issue being reported is. The MSW system also helps prioritize the security alerts for the responder group. The major problem with other reporting systems is that their database becomes corrupted with bad reports and inaccurate data over time because they assume all reports and users are equally credible.

Current security efforts rely on physical security measures such as door locks, security cameras, close circuit TV and security personnel. These measures may help prevent or limit property damage/theft but they are very limited in addressing common violent and non-violent safety issues such as bullying, drugs, vandalism, sexual assault, suspicious packages/people, etc., and they do not proactively notify security personnel (or people in close proximity) so they can respond faster. By using geofenced zones with a users GPS location (instead of GPS alone), MSW is able to build relative safety ratings for multiple zones, know how many MSW users are in a zone, push notifications to specific users within a zone, build historical data sets for each zone, distinguish a user location inside a multi-floor building with or without IoT sensors/beacons.

Various embodiments include one or more of the following features for satisfying government time sheet regulations and automating the submission of accurate time sheets: Polygon geofence work locations that require time sheets to be completed (e.g. perimeter of the building); use app to track staff time inside/outside the geofence; integrate with time sheet platform; automatically submit staff time onsite to the time sheet platform; eliminate the need for manual time sheet input by staff, reduction in time sheet errors submitted, no need to add hardware scanners for RFID tags. See FIG. 12. This is better than normal timesheet systems because it ties the person to the hardware with actions that they can perform to show that they are really there and not just leaving the ICD on a fixed spot. The MSW system can also track how long the device remains stationary with no movement by taking reading from sensors such as gyroscopes, Wifi, GPS, etc.

Various embodiments incorporate central monitoring by a team.

Various embodiments include one or more of the following features: Field Watch (sports, event planning, concerts, cell towers, etc.); Push pin GPS marking of any site (middle of field); GeoFence site with polygon points; Mark all fields, Schools (fields, gyms, courts), sportsplex, etc. ahead of time; usefulness to all sport associations, referee associations, private sports training, etc. to make sure coaches, referees and players are within the Geofenced field on time, when they leave (limits insurance liability) and pictures of field set up, documenting damage or lost and found items.

Various embodiments overcome one or more of the following multiple risk issues that impact the cost of doing business: Risk of not getting paid for work completed; Risk of low customer satisfaction (no visibility, no feedback); Risk of additional costs for poor quality of work; Risk of not being able to prove work was done right (standards of care or "SOC" satisfied); Risk of fraudulent customer claims; Risk of paying for labor hours not worked; and Risk of workers compensation claims (such as in between site visits).

Providers have the following business challenges, one or more of which is overcome by various embodiments: Can't be everywhere at once to monitor staff performance; No remote visibility into multiple customer sites day-to-day; No standardized way for staff to document quality of work or status; Limited means to verify the onsite work hours for each staff; Limited means to verify the productivity of the staff onsite; Limited means to prevent fraudulent customer claims; No consistent way to get customer satisfaction feedback; no historical archives of the maintenance, repairs, renovations, insurance loss history for a property.

Various embodiments implement one or more of the following features to overcome one or more of the foregoing problems: GeoFence customer sites to confirm when staff is really within the specified work zone and not simply nearby sitting in a truck with GPS; virtual time clock enables a more accurate and automated payroll process; Map view to see where all staff is located during work hours; GPS and time stamped pictures by SOW category to confirm status and quality of work done within the Geofence work zone; Tracking of mileage and expenses for each staff member; Status of percentage of work completed and when work will be done; Cloud based archive of data in case needed in the future (documents to support HR, Legal, Warranty, Insurance Claim needs), Immediate reporting of safety issues to company and security personnel; Safety alerts sent to staff to improve situational awareness. Thus, embodiments achieve one or more of the following: Protection from payroll fraud and workers compensation liability; Improved safety and protection of staff; Provides the best supporting documents to win a conflict over the facts.

Various embodiments employ one or more of the following: Map view to remotely verify location of all field reps at various time intervals; Confirm newly trained field reps are meeting standards; GeoFence and GPS tracking of reps when they are onsite and offsite to confirm they went to all assigned locations and hours worked; and pictures and data collected from field reps are assigned to the geofence from which they were taken (validated by GPS) to prevent mistakes and fraud.

Accordingly, various embodiments achieve one or more of the following: More visibility for customers into health care provided; Offer clients an ability to remotely see quality of care provided; Increase the capacity for managers to accept more work; and keeping a brand name in front of customers and prospects. If two providers offer a service for the same price but one of them allows the customer to see pictures that verifies the status and quality of the work performed each day, the customer will choose the provider that enables the ability to watch.

Embodiments thus achieve one or more of the following benefits: Improve the productivity and quality of life of managers by not having to drive to all project sites; Enhance sales revenue and customer attraction/retention; Enhance customer trust and satisfaction; Enhance employee and sub-contractor productivity and safety; Enhance Staff/Sub accountability for performing quality work; Enhance protection against blame for issues on the job site; Enhance accessibility and security of documentation.

Various embodiments include one or more of the following features: Commercial grade encrypted Amazon servers are used; Company controls their list of approved users; All users have unique login username and password; When company removes a user, MSW immediately stops user access to MSW portal; Data submitted to the MSW server cannot be accessed or deleted by unauthorized team users; All data submitted is time stamped and GPS location stamped relative to a geofence; Company MSW administrator controls what data that each user can access and use; and Users that have not been assigned by the project originator cannot gain access to the project data. Encryption algorithms include Internet Key Exchange, IPsec., Kerberos, Point to Point Protocol, Signal Protocol, Transport Layer Security, ZRTP, etc.)

Similarly, various embodiments achieve one or more of the following benefits: Innovative project management/ monitoring SaaS to improve customer trust and satisfaction; Improved crew accountability for performing quality work; Company protection against blame for issues on the job site; Improved quality, accessibility and security of documentation.

Various embodiments for Contractors overcome one or more of the following business challenges: Supervisors cannot be everywhere at once to monitor staff; No remote visibility into multiple project sites day-to-day; No standardized way for crew to document quality of work or project status; Limited means to verify the onsite work hours for each crew member; Limited means to verify the productivity of the crew onsite; No documentation to prove the condition of a site at any time during the project to prevent fraudulent customer claims of damage; Limited ability to access and analyze project data; No consistent way to get customer satisfaction feedback; GPS tracking of vehicles does not validate how many staff onsite, did staff get out of the GPS vehicle and into the work zone, is staff doing quality work, is staff being productive.

In various embodiments, MSW meets one or more of the foregoing business challenges by implementing one or more of the following features: Tracks all crew members when on/off job site with geofencing and GPS; Pictures/Video/ Audio time stamped and GPS/geofenced stamped; Track and control hourly wages and materials; Interval progress pictures of the status and quality of SOW completed; Start/ End of day pictures to prove condition of property; Contractor/Crew/Customer can all go in portal to stay informed throughout each day of project; Map view of all active project sites and all crews; "One click" communication between contractor/crew/customer; Secure, encrypted servers keep project records for easy access 24/7; Back End system auditing tools, automated push of data collected to payroll and invoice systems such as QuickBooks.

Accordingly, one or more of the following benefits and/or functions are performed and/or achieved by various embodiments: Faster processing of payroll and invoicing customers; Control of losses, only pay for SOW and labor proven to be done; Support invoicing for change orders; Employee productivity gains; and Increased customer satisfaction and loyalty.

Various embodiments are implemented in one or more of the following applications and with one or more of the following features: Small Business, High End Homebuilders (VIP treatment to attract/retain more clients); Fire Watch, Vacant homes/buildings proof of monitoring and condition of property; and Replace GPS tracking service on vehicle.

It should be apparent that embodiments may be implemented by any company doing project or service related work. Examples, at least some of which have been previously mentioned, include: Professional Trades such as Electrical, Plumbing, Mechanical, etc.; Renovation/Remodeling/ Construction; Landscaping and lawn service; Delivery Service; Maintenance & Repairs such as Auto, HVAC, Roofing, Appliances; Insurance claims work; Home health care; Moving & Storage; Painting; Pest/Termite Control Service; Sewer & Water Utility Line Repair Service; Insulation, Sub-Roofing, Plumbing, Electrical, etc.; and Charitable organizations.

Various embodiments include one or more of the following features: Start/End of day pictures and video clips to prove condition of job site; Show the crew cleaned up the job site at the end of the day; Show pre-existing damage caused when your team was not on premise; Pictures of stages of work completed that is otherwise costly to afterwards prove was done; and Cloud based archive of project pictures/videos in case needed in the future (warranty claims, litigation, HR, etc.)

Accordingly, embodiments achieve trust and verify that work was done right through one or more of the following: GeoFence a project site to confirm when crew is within the designated work zone (via GPS on the users ICD); a virtual time clock; Pictures and video clips at set intervals and of specific items; and GPS and time stamped pictures by SOW category to confirm project status and quality of work within a specific geofenced zone.

Whether it is a business that deploys their staff to perform a service or task at a remote client site such as maintenance/ repairs/construction/delivery/equipment installation, or a homeowner that hires a contractor or service provider to take care of their property such as lawn care/housekeeper/handyman/pest control/dog walker, there is a need to know if people are where they are supposed to be and if they are doing what they are supposed to be doing.

There are numerous challenges and questions that businesses and consumers face when they are not physically present to watch the work being completed by others. These are addressed by various embodiments that include and/or achieve one or more of the following: Determining whether a worker's time sheet accurately reflects the amount of time they were actually within the geofenced work zone working; Determining whether a worker is performing quality work, following safety procedures and protocols, and using the correct materials specified; Determining how many workers showed up, whether they get out of the truck with GPS to work, and/or whether they left the job site in another vehicle to go fishing all day instead of working; Determining whether people are working efficiently to complete the task/service as opposed to taking a lot of breaks or spending too much time offsite picking up materials; Enable a business avoid getting blamed by a customer for damage to property they did not cause; Enable a homeowner successfully hold a contractor accountable for poor workmanship as opposed to being without any supporting data that shows specific details of what was done incorrectly; Knowing the status of completion of the task/service and when will the workers be done so that they can be scheduled to the next work site; Enable a business protect itself from a workers compensation claim as opposed to not knowing whether the injury actually happened when working onsite; Enable a business to know whether all staff are safe and knowing when they are in an emergency situation that needs immediate attention.

In various embodiments, the methods and systems of the invention are designed to provide answers and supporting documentation to alleviate one or more of the challenges faced by businesses and consumers as described herein. Various embodiments provide for a business solution (B2B, B2C and B2G) and/or a consumer solution (C2C and C2B) that will receive data relating to tracking the onsite/offsite time of people assigned to perform a service or complete a task within a specified location; Time-interval visual status updates of work completed; Map view to monitor multiple people, projects and properties simultaneously; Emergency and worker safety alerts; and white labeling of the mobile application to allow business users to brand the application for their customers.

In various embodiments, MSW takes advantage of the following mobile device sensors to help manage projects through real time verification within established GeoFences.

Various embodiments include a GPS Sensor wherein MSW uses the GPS sensor to locate the X, Y, Z Coordinates to pinpoint a person on the globe overlaid on a map. The person can then use the MSW application on their ICD to mark out a polygon around their location and give it a name as a geofence. At this point, an ICD running the MSW application that is assigned to the created geofence is monitored whenever the ICD enters this geofence and the ICD can confirm the assigned tasks are performed within the geofence.

FIG. 8 is an illustration depicting an embodiment where multiple users of MSW are working within a geofenced building and using the altimeter of an ICD to calculate elevation and enabling geofencing different floors and rooms within different floors. Accordingly, various embodiments include an altimeter sensor. MSW uses the altimeter sensor on a ICD to measure how high the device is above the ground level. MSW takes this data and calculates it based on the Z level to see the actual elevation the person is relative to the ground. The person can then create floor level based GeoFences as a sub geofence to the main geofence. In addition the user can actually geofence rooms or areas of a building within a floor level to ensure that everyone can be confined to perform task within the specified floor level/Room Geofence. The MSW can confirm whether an ICD is within the Geofence and, if so, further confirm both an elevation and specific location within the Geofence where the ICD is located.

Various embodiments include a Phone Signal Sensor. MSW captures the phone network signal data or Wifi Strength at designated intervals at which this data is collected for each ICD and puts it all together with the Geofence/GPS data to gather intelligence on if the ICD will be able to be monitored. If the signal strength is low, MSW stores all data locally in a secure encrypted temporary location within the application and syncs to the cloud when a signal is reestablished. After the signal is re-established and data synced the data within the app is then erased in order to no longer be accessible, including in an unauthorized access thereof.

Various embodiments include a Battery Life Sensor. MSW collects battery life remaining data as part of the critical data that is always collected with GPS; Altitude; Signal Strength.

Various embodiments include a Bluetooth sensor. MSW uses bluetooth connected devices to get additional data from other devices to enhance accuracy of geo-location within buildings and to exchange data with other people and systems.

Various embodiments include an Oxygen Sensor. MSW uses Oxygen sensor data to enable users to check on other users or themselves for health monitoring. For example, a manager can get a safety alert for a worker that shows a low oxygen level.

Various embodiments include a Heart rate Sensor. MSW uses devices such as smart watches, ICDs and heart rate monitors to send heart rate data to MSW to assess when a user is under stress so that the application can alert the appropriate emergency protocol on file.

MSW system uses the heart rate monitor and oxygen data to integrate to medical systems for patients and also fitness applications such as google Fit and Samsung Health to assess the general health and stress level of the individual carrying the ICD. MSW also uses the gyroscopes and accelerometer in the ICD to identify if the user is running, falling or had a high impact collision.

Various embodiments include a Gyroscope Sensor. MSW uses the Gyroscope to measure orientation of the ICD so that it can gauge orientation when tasks that require such data are being performed.

Various embodiments include an Accelerometer. MSW uses the accelerometer data to identify when a significant collision or fall has occurred. This data triggers specific protocols using MSW's dynamic workflow data engine. MSW also uses the Accelerometer data in conjunction with GPS data to determine total movement by the user to ensure that they are doing the work that is expected and they are not staying stagnant for too long.

Various embodiments include the use of biometric sensors including but not limited to Fingerprint, Iris, Retinal, DNA. MSW uses the biometric sensors on an ICD to authenticate a user into the application.

Various embodiments include facial recognition. MSW uses facial recognition to authenticate a user into the application, as well as identifying people that should not be within a designated geofence (e.g. sex offender on a school campus).

Various embodiments include a Temperature/Moisture/humidity Sensor. MSW also collects temperature, moisture and humidity data from the ICD to be able to get a reading of the environment and send an alert when the environmental metric(s) fall(s) out of a designated range(s). MSW also similarly uses wrist devices to get skin temperature of the user to assess body temperature compared to outside temperature. The MSW system then uses this data to assess if the person carrying the ICD is having a fever and MSW (coupled with the information of heart rate, gyroscope and accelerometer) may determine the general health of the user by combining all of these data elements. The MSW system uses the customer's baseline data while at rest to then take the combined data values to ascertain when a potential life-threatening situation is occurring.

In various embodiments MSW can turn on the ICD camera and microphone automatically if ever a defined emergency condition should arise. Again MSW uses its flexible workflow engine for users to define appropriate action to be taken when an emergency occurs whether it be heart rate; temperature, oxygen or high impact from accelerometer. The workflow engine allows the business logic layer that sits in the cloud to interact with the MSW application on the ICD. MSW then defines its custom workflow that looks at all the sensor metrics on the ICDs and sets combined thresholds. When the upper or lower threshold limits are exceeded, the MSW workflow engine sends communications back to the users ICD to turn on camera, microphone, or flash the device built in light.

FIG. 35 is an illustration depicting a FOB mobile device according to an embodiment of MSW further including clock in and clock out buttons, internal clock, camera and rechargeable battery. Consistent therewith, in various embodiments MSW has a hardware based Key FOB that has an internal battery that is rechargeable. This FOB is especially beneficially for users who do not carry any other compatible ICD and can be used with the MSW smart lockbox (see FIG. 32). The hardware used by the MSW FOB is comparable to hardware described elsewhere herein for other forms of the MSW mobile device. The FOB also has a comparable internal memory. The internal memory is used to store data such as GPS, location and images. The data is then synched to another ICD and then transmitted to the cloud. The FOB clock can be set prior to distributing the FOB. The FOB has a unique identifying ID associated with a user on MSW. The user can use the clock in and clock out buttons to specify when they are ready to start and stop working on a work task or service. The FOB battery is rechargeable through its USB connection. The panic button can be red and used to send a panic signal as described elsewhere herein. The panic signal can be audible as well and connect with any Bluetooth or WiFi device to send the location of the FOB downstream. The internal clock is computerized so that it can be tied to zulu time zone and the MSW application on the server makes adjustment for the time as needed. The internals has a single logic board that can house the clock, memory chip, camera sensor, Bluetooth, NFC and WiFi.

The methods and systems described enable various embodiments of the invention to deliver several advantages over and/or features not found in the prior art, including but not limited to one or more of the following: Using GeoFencing (set up via polygon points) to specify the exact job site boundaries where people are to perform a task/service; using X, Y, Z coordinates plus altimeter instead of only GPS latitude/longitude coordinates, and thereby enabling the tracking of ICDs (people) in multi-floor buildings (3D tracking); Pictures from a work site are validated to be within the specified GeoFence; Time interval pictures and push notifications to workers to submit status of work completed and reminders to submit new interval pictures; Tracking of both onsite and offsite time to ensure efficient use of time to pick up materials, length of lunch breaks, etc.; Automatically tracking time onsite as soon as an ICD (person) enters the GeoFence of a work site they are assigned to work (staff does not have to push any buttons to clock in); Ability to create a polygon GeoFence on a mobile device while onsite with satellite map (push button while at site to GPS flag the site and then create the desired GeoFence for the specific work zone); Worker safety (panic button or automatically when certain ICD sensor metrics for oxygen, accelerometer, skin temperature, heart rate are not normal) that activates audio/video features on the ICD and streams it safely to the cloud immediately, notifies via text/email to up to a certain number of people (such as five) their precise location within a geofence and that they are in trouble, and calls safety/security personnel associated with the geofence; Consumer to Business (C2B) platform to enable property owners to track when and where people are on their property, are the tasks/services being performed correctly or not; pictures and records to historically archive all repairs/maintenance/renovations conducted on the property; White labeling of the mobile application to allow B2C/B2B/B2G users to brand it for their customers; integration with new ICD sensors such as heart rate, oxygen levels and medical pacemakers to help monitor the health and safety of people.

The MSW system integrates with the workflow engine logic described above to send push a notification to the device. The MSW FOB gets the notification by flashing the LED in a specific pattern.

Certain embodiments are employed on one or multiple athletic/sports fields to geofence multiple sites within one property. This is an example of how multiple shaped geofences are implemented in some embodiments. See FIG. 33.

In various embodiments, MSW combines the geofence data that is stored in the MSW database with data from several sensors from the user's ICD. MSW users create a geofence in two ways: 1) User types in a property address into MSW and MSW automatically finds and displays the location on a map; 2) User is physically located at the property location to be monitored, user clicks a GPS location button on MSW, MSW automatically finds and displays where the user is on a map on their ICD. Once the location is on the map view, MSW users use a unique polygon based algorithm to outline a geofence around the specific area to be monitored. The polygon based algorithm leverages the ability for someone to create n random points with auto closing by clicking on the first point. MSW uses the altimeter sensor on an ICD to measure how high the device is above the ground level. MSW takes this data and calculates it based on the Z level to see the actual elevation the person is relative to the ground. The person can then create floor level based geofences as a sub-geofence to the main geofence. A MSW user can create a geofence inside a multi-floored building or outside by clicking on a MSW app button where they are located at each polygon point they want to include in the geofence and then auto closing by clicking on the first point. This allows MSW users to digitally create geofences at various altitudes when needed. Any user of an ICD that can connect to the MSW application then monitors when MSW users enter the geofence within a certain tolerance factor (e.g. 10 foot tolerance). The invention uses a combination of the data from the sensors on the ICD (GPS; Cellular; Assisted GPS; Altimeter) to always locate the ICD (user) who has MSW running in the background. MSW identifies when they enter a polygon geofence and monitor where they are within the polygon geofence through constant collection of sensor data. MSW also stores when the user leaves the designated geofence and that data is combined with the work data and tasks that have been performed to know if these were completed and how long it took to complete. All this data is stored in a relational database in the cloud server environment. The server application is not limited to the cloud. It can be deployed to a user's in house server environment in an encrypted manner to secure our software IP. MSW also collects geofence data using its unique MSW FOB hardware.

FIG. 9 is an illustration depicting an embodiment with users standing in an open location and using their ICD to draw a multiline polygon to define a Geofence having Geofence Zone 1 and Geofence Zone 2. Consistent with this illustration, various embodiments include an application algorithm that allows supervisors to determine multiple geofences within a work zone. See FIG. 4. The algorithm may be implemented by allowing the multipoint polygon geofences to be overlaid on each other and store all the 3D geo-coordinates for each point and associate these points for a specific polygon to a saved name. So by having N number of points associated to multiple names allows MSW to monitor multiple geofences by multiple users in the system. All this geofenced data is stored within a relational database for every point within the polygon. All these Polygon points are associated to a geofence. This combining of GPS points to define a geofence gives MSW the ability to create "nested" and overlapping geofences that support situations such as people working in a multi-floor building or property with multiple parking lots or athletic fields to be monitored. MSW geofence technologies gives MSW the ability to create geofencing around non-addressable locations. MSW creates a hierarchical based approach to how geofences are stored. MSW also has a role based security model that allows different users to only be able to access data and legitimately enter specific geofences if they have been given permission. MSW also integrates with scheduling applications to identify who can be within a geofence within a specific time.

MSW also allows for users to load CSV and excel files of mailing addresses (or other coordinates) with no limitations on length, to load into the application, and allows for automatic setting of a map shape or radius from each address's center-point. This is designed to create mass loading of addresses with predetermined geofences. MSW allows for users to edit any of these geofences using its polygon based tool that overlays on any mapping software such as google maps, mapquest, apple maps, etc.

MSW also allows for users to load CSV and excel files of mailing addresses (or other coordinates) with no limitations on length, to load into the application, and allows for automatic setting of a map shape or radius from each address's center-point. This is designed to create mass loading of addresses with predetermined geofences. MSW allows for users to edit any of these geofences using its polygon based tool that overlays on any mapping software such as google maps, mapquest, apple maps, etc.

FIG. 33 is an illustration of a similar embodiment of MSW implemented in a recreational area such that each of a plurality of sports fields has its own geofence; and, all of the plurality of sports fields are contained within a single larger geofence surrounding the entire sports complex. Embodiments such as this enable MSW to track coaches, players and referees on each field. The geofences can be established using polygon points as detailed above.

FIG. 34 is a top view of an embodiment of MSW having a geofenced perimeter and a separately geofenced building located entirely within the geofenced perimeter. In an exemplary embodiment as depicted, the larger perimeter corresponds to a parking lot surrounding the building. This illustration shows that the MSW Geofencing approach delivers superior flexibility in creating work zones to be monitored. The ability to nest polygon geofences gives users the additional capability to monitor how ICDs interact in geofence overlaps. It also gives users the ability to embed geofences as they pertain to a location such as a school campus that has buildings, fields, parking lots, etc. that are all interacting within the larger property boundary geofence. FIG. 34 shows the limitation of using GPS on vehicles. Using only a GPS on a vehicle to track (a) worker(s), people can be in the vehicle "onsite" but not in the building where the work is to be done. This limitation creates a scenario where a worker is getting paid for sitting in the truck having lunch, making calls, napping, etc. The embodiment of FIG. 34 is able to determine whether the worker is in the building working or in the parking lot.

In various embodiments, MSW uses data from the altimeter on an ICD to introduce the third dimension to geofences. MSW has a unique algorithm that calculates the altitude from the GPS data to identify what floor of a building that the worker is located. MSW is able to calculate the floor level by taking the altitude of the base floor and then the altitude at which the reading is taken from the device and then use the input of the height of each floor in the building. We are able to take and use the difference between the reported elevation and base of the building elevation and then add the height of each floor to the base elevation which gives a fairly accurate reading of which floor the device is on in the building. The equation that we use is (Sum of consecutive floor heights should be less than (Recorded Altitude minus Base Altitude). The floor height is automated by linking into CAD drawings for the building to automatically get the height of each elevation, or may be manually input by the user. This data of altitude is used to create geofences that show levels or multiple of levels. Certain embodiments use a database relationship to create a many to many association between a user and geofenced regions and also a single geofence can be associated to multiple users. Thus, MSW has an ability to compare time onsite/offsite data in MSW with staff time sheets and vendor invoices to improve accuracy of payroll/vendor payments and automatically do payroll without time sheets or compare time sheets with MSW onsite/offsite times to find discrepancies exceeding a minimum time interval threshold that can be dynamically changed.

In various embodiments, MSW achieves this through the use of the data collected on the ICD while in the geofence and the activities that have been assigned to the user to perform within the geofence. MSW utilizes an internal workflow engine that allows supervisors to approve the work quality and grade it. This information is then compared with any organization's scheduling system to determine how the real data compares to scheduled data. MSW achieves this by exporting its data through its API to the external scheduling and payment systems. MSW also has an open architecture that allows it to integrate and pull scheduling data from various industry standard scheduling systems and generate a comparison chart that shows every user's scheduled hours to actual hours. MSW then allows supervisors to quickly identify staff who are the time fraud perpetrators through MSW's dynamic reporting engine.

In various embodiments, MSW uses the data collected on the ICD while in the geofence and the activities that have been performed by the assigned user within the geofence. As part of the MSW SOW category based system, the app is able to give every user tasks that are associated to a geofence. These tasks include voice recording; taking a photo/video and specifying percent completion of the tasks. All this data is stored and MSW uses an internal algorithm to determine the time spent within the geofence and also the amount of materials that have been used within the geofence inventory. This is done through photos/videos that are taken and also scans being done on the barcodes to specify which materials were used during a job as described in the scope of work. MSW also allows for users to go outside the geofence to purchase items but are required to take photos of the receipt which MSW stores and uses in conjunction with optical image recognition (OCR) and is able to compare the items to the photos being used and also taking into account the percentage of work completed by the person performing the task. MSW also monitors the route that the user took to the location and back to the geofence and compares it with GPS and traffic data to ensure that the optimal route was taken for mileage claims. MSW is then able to eliminate mileage and long trip hours out of the geofence. This prevents fraud. The foregoing enables an ability to automatically generate vendor invoices to include time and materials used to complete the task or service performed.

In various embodiments, MSW uses the data collected while the user takes pictures, videos or voice recordings. MSW can reject data submissions from outside the geofence automatically or MSW admin level users are able to either approve these from the portal side of MSW or on an administrative application. MSW uses differential data technology to determine when the internet quality on a phone (based on its phone network quality data) is not sufficient to transmit the data. The differential data technology checks the last known signal strength that is above a single cell tower connections and also that the data speed is above 2G to authorize data transmission. If signal strength is outside of the designated parameters, MSW then caches the data locally on the ICD until it can resume transmission with a higher quality. This solves the problem of partial data packet transmission. All the data collected from MSW is time stamped in the database on the server and also has the data assets time stamped on the local ICD. By knowing these data elements, the time stamp and from which ICD/geofence they originated gives MSW the ability to synchronize the data on the server at a much later time when the ICD has enough signal strength and also battery life. The data is pushed up to the server in real time of configured intervals or whenever there is internet connectivity. All the data is stored on the device in an encrypted format and when syncing is completed to the server, the data is erased from the ICD so that the application does not fill any ICD memory.

In various embodiments, MSW allows admin level users to create dynamic picture SOW category(s) and time interval requirements. Picture SOW categories are then associated to each project in a main grouping called Statement of Work (SOW). MSW also allows for picture SOW category sub grouping through its hierarchical database model. When users get assigned to a task or service, they see the details of the SOW including the picture requirements (time interval, quantity and categories). When MSW detects a user within a geofence and starts to track time onsite, MSW also tracks the pictures being synced to the portal to meet the SOW requirements. Like a stopwatch, as soon as a picture is received in the MSW server, the time interval is reset in MSW. If the time interval expires without a new picture received in the MSW server, an automatic reminder notification is sent to the user's email/text/phone by MSW that it is time to take and submit progress pictures.

MSW provides the ability for different customers to allow custom forms that can be associated with their internal systems. These forms can collect the data and use MSW's API to push the data to the customer's custom $3^{rd}$ party application. These forms are associated only with the designated customer; however, MSW may have the ability to reuse these forms as templates for other customers who have similar requirements. These forms use a JSON format to be able to take the form elements and the designated values to send to any type of $3^{rd}$ part application.

In various embodiments, all picture SOW categories are stored and related across all user projects. This gives MSW the ability to generate reports across regions and industries. MSW is able to show trending reports to help business users with detailed market research on which staff users are good at specific jobs and MSW rolls that data up to evaluate performance of teams that work together and to entire organizations. The trending reports are done by taking customers with similar industries and revenue sizes to see what sort of complaints are typical in a specific job type, in a specific region in the country to be able to predict problems for other similar customers who sign up for the product. MSW also has a rating engine where different people are able to rate workers based on the quality of work. This data is also mined and used to provide suggestions for good skilled resources and service providers. MSW also uses the data to assess how well properties are being maintained to help provide the data for insurance agencies to assess risk. For instance, consumer users will store condition of property/equipment and contents of property pictures/video/audio safely in the MSW server that can be used to support insurance and warranty claims. For example, when a house burns down, MSW can prove contents and condition of house before the fire.

In one example, the SOW is such that MSW requires four pictures for every two hours of work completed. MSW sends the assigned workers a reminder text/email/phone call if less than four new pictures have been submitted in the last two hours.

In various embodiments, at least in part of which has been previously detailed, MSW can track all of the ICDs (users) that have entered a geofence and how long they are within the geofence. MSW allows for granular configuration for each of the users on the time interval sensor based data is received from all mobile devices (which includes wearables and internet of things "IOT" devices and sensors). MSW receives this data on the server and automatically transfers it to display on an electronic map so that users will see each geofence they have created. When users click on or hover on a geofence, a text box appears and provides detailed information on data received from within the geofence such as arrival times, what users are currently onsite, property address, complaint pictures submitted, etc.

In various embodiments, MSW has a role based security model and workflow component which gives it the ability to give various levels of access to customers and anyone with a registered userID on MSW access. MSW allows subscribers to have the option (as part of the workflow) to ensure that a supervisor first approves the tasks and pictures before the customer is able to view it within the MSW portal. MSW allows for a free form entry by the user performing the tasks to estimate a percent of work completed, and MSW is also able to internally estimate the percentage of work completed based on data pulled from scheduling systems that includes information such as the expected time to get a particular task done. Businesses can deny viewing access to all or selected picture categories and work completion information they don't want others to see.

In various embodiments, MSW has features as part of it that allows for customers to use their MSW application to enter the geofenced area and take photos which can be posted under the customer complaint category, "issues". When these are posted, the workflow engine in MSW will then automatically text/email the supervisor of the Geofence and the people assigned to the task/service that a customer complaint has been posted. MSW also provides a mechanism for the supervisor to broadcast a message to the entire crew within the geofence in which the complaint was posted. MSW supports multiple ways of notification delivery. It will allow for email; text or direct notification on the ICD via the MSW application.

In various embodiments, multiple vendor completion information is tracked automatically and enables the coordination of vendor schedules to complete a project. See FIG. 36. For instance, if the project involves two subcontractors such as an electrician and a painter, and the painter cannot start work until the electrician is done, the painter can go to the online portal and see the date/time the electrician expects to be done so that they can schedule their painters. Accordingly, in various embodiments, MSW supports a dependency hierarchy that is able to identify which order tasks must occur and define the lead time needed for the next crew. MSW is able to use this timing mechanism and individually notify each of the other crew members based on their current location to the geofence based on predicted traffic conditions to ensure they make it to the site in time to start their tasks. MSW achieves this through very complex SQL and NoSQL queries via fuzzy logic to create the best estimates for each member of the crew for the follow on task. MSW fuzzy logic combines data from traffic applications such as google; data of the gps relative the geofence data, looks at routing data to analyze if the user used the best route at the best time to make it between geofences or from a specified location to a geofence. Fuzzy logic is also used to determine when a person may need attention by combining multiple sensor data such as temperature, humidity, heart rate, pace of movement by accelerometers. Thresholds and parameters of each of the values may be adjusted by setting upper and lower limits so the safety limits have tolerance levels. MSW is also able to detect delays in task completion of a current crew so that MSW can alert other crews that must follow to move to other job sites to avoid wasting time waiting. This enables companies and individuals to optimize staff and resource utilization.

In various embodiments, consumers monitor people performing a task/service on their property, and may allow their vendors online portal access to view selected picture categories and status updates on work completed by other vendors. Accordingly, in various embodiments, MSW has a flexible permissions based model that allows for different access. MSW views all items in its database as objects and all these objects can have permissions such as read, write, delete, update, edit. There is complete logical segmentation of each project and company data within MSW.

In various embodiments, MSW has an implementation of a panic widget that can be found on the mobile device or the MSW Fob. This Panic button is accessible to the user even when the screen is locked. This functionality is linked to a workflow process that is defined by the supervisor. This workflow process includes several escalation logic bases and timings. This logic allows supervisors to determine methods of communications and the person who should be communicated to and in what time frames. All these parameters are stored as setup values as part of any user setup. This data is combined with the other sensor based data to determine the legitimacy of the alert. If someone in the escalation chain is contacted, and they are able to contact the person and determine that the alarm is no longer necessary, they can deactivate the alarm. The alarm will not be fully deactivated by just the manager but it has to be validated by the person who triggered the alert before it is fully deactivated. MSW also includes automatic activation of the front facing camera of the device and if the proximity sensor shows that the front of the device is not exposed it then activates the rear camera. MSW also activates the microphone and starts to record and stream the event in real time. When the camera is on it does not make itself known on the screen of the device.

In various embodiments, MSW uses all the data from a user ICD within a geofence to monitor the vitals of a user. MSW uses rules and dynamic fixing of sensor parameters and thresholds so that each user has a unique set of safety parameters to determine when they are in a potential life threatening situation. If a user's safety parameters are exceeded, MSW immediately notifies the people on the users emergency contact list via email/text/phone call. MSW also allows for flexibility to monitor people who go outside the geofence to identify if the ICD or wearables are sending sensor readings that fall outside the set thresholds.

In various embodiments, MSW is able to facilitate Consumer to Business (C2B) within the application by allowing the consumer to have multiple service providers who are either given the Key FOB or use their personal ICD with the MSW application. When using the MSW app on an ICD, the service provider is automatically clocked in/out when they enter or leave the geofenced work zone and they will take the required pictures to document the quality of work performed.

Referring again to FIG. 35, when using the FOB, the service provider will enter the property and the FOB will be in a MSW Smart Lockbox (FIG. 32) with a code (similar to a real estate sellers Lockbox model). The worker will use the FOB to clock in and take a photo of their ID or face with the FOB to associate who specifically came to do the work. They will perform their tasks and take a photo(s) of the finished work on the property. After they have completed the work, they will then place the FOB in the lockbox again and leave it for the next service provider. Within the Lockbox there is a USB port that the FOB plugs into to keep it charged and also to transmit the data to the MSW server so that the Customer can see the work that is completed. MSW will use optical character recognition software on the worker's ID image when loaded up to the server to identify which company they work for and the person's name. Facial recognition software is also used to identify the person's name and company they work for. This association gives the customer the ability to track multiple vendors who do not have MSW on an ICD. In the case of vendors who already use MSW, the association is created with the consumer to the vendors MSW ID. This way the worker can use their own ICD and use MSW with the entire functionality available to the ICD.

MSW also uses Near Field Communications (NFC) so it can communicate with hotel rooms that cater to this technology to be able to identify which service provider enters a room and performs the task (e.g. house keeping). Vendors will also be able to take photos to confirm completion of the work within the room. NFC technology is also used in conjunction with MSW's Geofencing so all ICDs (people) accessing the rooms can be monitored. MSW is able to monitor service providers in office buildings to ensure security and quality of work, as well as delivery of digital mail, data and packages to the MSW "smart/digital mailbox" in FIG. 22B.

In various embodiments, MSW provides a comprehensive map view using existing mapping technologies such as Google Maps to overlay an entire landscape of MSW users and show where they are. The map view has filtering/ "sorting" technology that allows users to only see people, projects, objects and properties that are of interest. For example, users can isolate geofences being worked by a selected person, company, time period or specific SOW such as only projects that have painting pictures submitted.

FIG. 25 is a schematic depicting interfaces between component parts of an embodiment of map view sorting in MSW. As indicated in FIG. 25 the map view can be sorted by one or more of projects with staff onsite; projects with certain issues such as complaints; projects with no staff onsite; the name of the customer; and the name of one or more staff members.

Also, in various embodiments, different color codes and symbols are used for each geofence to visually indicate important data to users of the map view (e.g. green sites have a user onsite, yellow sites have no users onsite). Users can customize color codes to show geofences and ICDs within the geofence. MSW allows all metrics to be dynamically selected within the map view. The metrics include data such as (but not limited to) the user performed a task outside of the designated threshold, the user was not within the Geofence at the designated time; the user's ICD was not connected for a long period of time even though the battery life and data signal strength were last reported as fine before they went offline; the user's last known activity; the client submitted a complaint against the user; the user within the geofence is not responding and it is after normal business hours; the user's health metrics are elevated; a panic button has been pushed by a user; and any additional metrics from the data collected.

Accordingly, various embodiments enable a map view of each geofenced site registered for each user that uses color codes, symbols and text information to depict the quantity and identity of assigned people onsite, time of arrival, name and address of site, percentage of work completed, estimated date/time of completion, quantity of pictures submitted, number of customer issues reported and other relevant data.

In various embodiments, MSW can determine if the application is "turned off" a user's ICD by sending a request out to the ICD and see if it gets a response. If MSW does not get a response, MSW then sends out a text message to the ICD to ask the user to turn on the application. If the user does not respond within a specified time, MSW then makes an automated call to the user. MSW collects all sensor based data on the ICD within configured time frames and stores this data locally on the ICD and syncs it to the MSW server at configured time intervals before it deletes it off the ICD. MSW uses the local ICD to continue to store the data such as GPS; signal strength; Accelerometer data; temperature data; etc. MSW is intelligent enough to determine as soon as the device has internet access to sync up the data. MSW also compresses the data on the device before transmitting to minimize data usage. The resolution of images/videos required is configurable.

MSW users have the option to have MSW send an automatic notice to users to remind them to turn MSW on or off at a set time each day. For instance, business users can have MSW send a reminder notice at 9 am during a work day to any staff that have not yet turned MSW on. A reminder to turn off the MSW app at the end of the work day is also available so that monitoring after hours is not done by the business.

In various embodiments, MSW encrypts all of its data on the local ICD and deletes it as soon as the ICD syncs the data to the cloud. This is a security feature to ensure that data is not dispersed over a multitude of devices.

In various embodiments, MSW supports white labeling of the portal and the application. The way this unique offering is done is by allowing all companies who use MSW to be able to load their company logo and color scheme that is stored as part of their profile to then send a unique link that their customers use to download the app. MSW also allows for masked URL's such as companyname.mobilesitewatch- .com to truly white label the solution. The URL for downloading the application and accessing the portal provides a unique experience where the application becomes customized. All of the email and alerts become customized as well.

In various embodiments, MSW tracks the location of users as long as the application is running. MSW is able to look at the user's current location when they are supposed to start work, and determine if they used the optimal lowest mileage route to their geofence work location. MSW also interfaces to use traffic data to verify the estimated time of travel for the user. The purpose of this technology is to ensure that there is no mileage and travel time fraud.

Accordingly, various embodiments enable tracking of mobile device operational data such as battery life remaining, signal strength and other relevant data to validate people have not turned off the application during times when they are to be monitored. MSW can automatically remind users to turn MSW on during normal business hours, and this solves a common problem of staff making an excuse that they forgot to turn on MSW when they simply do not want to be monitored.

Accordingly, various embodiments enable use of data from health and medical related sensors and devices such as heart rate, oxygen levels and medical pacemakers to help monitor the health and safety of people. For instance, if a person within a geofenced zone shows a sudden extreme increase or decrease in heart rate, the manager can be notified to contact the person to make sure they are okay or need help. Thus, various embodiments implement the following features and achieve the following benefits for medical and non-medical care applications: Enhance patient and family member trust and satisfaction with a caregivers standards of care with documented time and pictures with patient; Protection from regulatory penalties by having documents proving compliance with standards of care; Enhance staff accountability for providing quality care and proper billing for hours worked; Protection from fraudulent customer claims for issues not caused by a caregiver; Know when a caregiver arrives/departs a customer's home; Accessible and secure archives of health care are provided.

FIGS. 5, 6 are flow charts depicting embodiments of both on property and not on the property creation of a geofence zone for monitoring in MSW. The embodiment of FIGS. 5, 6 incorporate a variety of features according to the various embodiments also described elsewhere herein.

FIG. 19 is an embodiment pertaining to delivery of a package, parcel or letter, where a signature is required, the MSW is implemented as follows. A delivery service using MSW will pre-register their customers ICD and geofence the preferred area that packages are to be delivered to the customer. Customers will add MSW app to their ICD. The delivery service using MSW will then pre-register their customers to use the MSW virtual signature option for future signature required deliveries, and have an approved customer signature on record. When a signature required package is entered into the delivery service system, a notice goes to the MSW customer ICD indicating the estimated date/time for delivery. When the delivery person is within a certain distance from the customer's geofence (e.g. 10 miles), an automatic MSW notice goes to the customer's ICD to confirm the delivery is close by and to be at the designated geofence. The customer has two response options on their phone: 1) Virtual signature approval to leave package; or, 2) Reschedule delivery of package. MSW automatically sends the customer's response to the delivery service person's ICD. If the customer wants to reschedule, the delivery person continues to the next delivery on route and rescheduled delivery info is sent to the MSW customer. This solves a major problem and cost by reducing unsuccessful delivery attempts and reducing customer complaints of not knowing when important deliveries are being made. If delivery is approved, when the delivery person is within the designated MSW geofenced area, MSW will automatically notify the MSW customer's ICD that the delivery person is onsite and within the geofence. The delivery person takes a picture of the package/materials to document the condition, location and time of the delivery within the designated geofenced area. See FIG. 20. Delivery data is automatically sent to the MSW server, and MSW sends a copy of the picture to the MSW customer's ICD and stores it in its portal as well (all data is also sent to the delivery service server).

Accordingly, various embodiments achieve one or more of the following benefits: Improves the odds of customer being present to sign for package; Reduces the amount of time a customer has to wait at a delivery location to sign; Reduces delivery service cost to make multiple attempts and trips; Provides proof that a package is delivered in good condition and in proper area; and improves delivery person productivity to skip customer sites requesting a rescheduled deliver.

Other embodiments of MSW pertain to the delivery of packages, parcels, letters, and the like. In some such applications that are regular deliveries with no signature required, various embodiments include one or more of the following. A delivery service using MSW will pre-register their customer's ICD and geofence the preferred area that packages are to be delivered. Customers will add MSW app to their ICD. The package is entered into the delivery service system and a notice goes to the MSW customer ICD indicating the estimated date/time for delivery. When the delivery person arrives at the designated MSW geofenced area, MSW will automatically clock them into the MSW geofence, and MSW will automatically notify the MSW customer's ICD that the delivery person is onsite and within the geofence. The delivery person then takes a picture of the package/materials to document the condition, time and location of the delivery within the designated geofenced area. Delivery data is automatically sent to the MSW server, and MSW sends a copy of the picture to the MSW customer's ICD and stores it in the MSW portal (all data is also sent to the delivery service server as well).

Accordingly, various embodiments achieve one or more of the following benefits: Improves odds of customer being present to accept package; Provides proof that the package was delivered in good condition and in the proper area; Reduced risk of being blamed by customer for lost or stolen deliveries; Improves customer awareness and records of what they have received.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Software programming or code can be stored in a computer-readable medium and can be operated on by a processor to permit a computer to perform any of the steps, operations, methods, routines or portions thereof described herein. Various steps and functions of embodiments herein may be described as being carried out by specialized modules. It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc. The term 'module' may refer to one or more physical processors during execution of processor readable instructions, the processor readable instructions, circuitry, hardware, storage media, or any other components.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments. While the embodiments may be illustrated by using a particular embodiment, this is not and does not limit the invention to any particular embodiment and a person of ordinary skill in the art will recognize that additional embodiments are readily understandable and are a part of the example embodiments.

It will also be appreciated that one or more of the elements depicted in the drawings/figures can also be implemented in a more separated or integrated manner, or even removed or rendered as inoperable in certain cases, as is useful in accordance with a particular application. The invention encompasses every possible combination of the various features of each embodiment disclosed. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

We claim:

1. A system for tracking activity in an area, comprising: one or more Internet Connected Devices (ICDs);

a remote cloud-based server;
a Key FOB comprising a USB port, clock in/clock out button, camera, internal memory, battery and clock, the internal memory storing a program comprising computer executable instructions executed by at least one processor, the at least one processor running the program for syncing data with one of the ICDs and for gathering Global Positioning System (GPS) coordinates, time when the clock in/clock out button is pressed and image data; and
installed on an ICD and/or the remote cloud-based server:
a geofence definer;
an entrance/exit determiner; and
a time calculator;
wherein the geofence definer uses unlimited non-symmetrical polygon points to define a geofenced area;
wherein the entrance/exit determiner makes determinations as to whether a user has entered or exited the geofenced area when the user selects the clock in/clock out button; and
wherein the time calculator calculates a time the user spent in the geofenced area and outside of the geofenced area.

2. The system of claim 1, wherein the system is configured to:
define the area with a geofence using unlimited non-symmetrical polygon points;
determine when a particular person has entered the polygon geofenced area;
determine when the particular person subsequently exits the polygon geofenced area;
calculate a time the particular person spent in the polygon geofenced area and also outside of the polygon geofence area; and
determine whether the particular person performed a particular task(s) during the time in the polygon geofenced area;
wherein determining when the particular person has entered the polygon geofenced area is performed automatically, and the determining when the particular person subsequently exits the polygon geofenced area is performed automatically.

3. The system of claim 2, wherein the determining when the particular person has entered the polygon geofenced area is performed by the particular person manually clocking in, and the determining when the particular person subsequently exits the polygon geofenced area is performed by the particular person manually clocking out.

4. The system of claim 2 for tracking activity in one or more areas,
wherein the system is further configured to:
define a first area with a first polygon geofence;
define a second area with a second polygon geofence;
determine when a particular person has entered the first polygon geofenced area;
determine when the particular person has entered the second polygon geofenced area;
determine when the particular person subsequently exits the second polygon geofenced area;
calculate a combined time the particular person spent in the first and second polygon geofenced areas;
determine whether the particular person performed a first task in the first polygon geofenced area; and
determine whether the particular person performed a second task in the second polygon geofenced area.

5. The system of claim 2, wherein the defining the area with a geofence using polygon points is performed from a location physically within a boundary of the geofenced area manually using user mouse clicks, closing the polygon based on a user's clicking on the original point, or by a user walking the perimeter of the desired area and making each polygon point within the software system by clicking a Global Positioning System (GPS) location button at each point and then closing the polygon by clicking at the starting point.

6. The system of claim 2, wherein the defining the area with a geofence using polygon points is performed from a location either physically outside or inside a boundary of the geofenced area, wherein a geofence polygon is created within the software system by a user either entering the property address or Global Positioning System (GPS) coordinates on an ICD to automatically get a map shape of the current property boundaries.

7. The system of claim 2, wherein the defining the area with a geofence comprises stacking a plurality of polygon geofenced sites on top of each other or within each other on the same level, and the polygon geofences do not have to be symmetrical in shape to be stacked.

8. The system of claim 7, wherein the plurality of geofenced sites are on multiple floors of a single building, and the steps of determining when a particular person has entered the geofenced area, determining when the particular person subsequently exits the geofenced area, calculating a time the particular person spent in the geofenced area, and determining whether the particular person performed a particular task during the time in the geofenced area, are performed for a plurality of persons in the plurality of geofenced zones.

9. The system of claim 7, wherein the internal sensors to the ICD are used to geolocate a particular ICD; the survey based technique known as resectioning is used to get to the mathematical intersecting point of all the Wifi, Bluetooth, cellular, altimeter and GPS points to get a more accurate geolocation within any structure; and a gyroscope sensor gives the system orientation data of the ICD.

10. The system of claim 2, wherein the defining the area with a geofence comprises defining a plurality of adjoining geofenced zones.

11. The system of claim 1, wherein the system is configured to:
utilize the geofence definer to define one area or multiple areas with a geofence using polygon points;
determine when a particular person is within a particular polygon geofenced area;
determine where the particular person is located within the particular polygon geofenced area;
receive a safety issue image selection that represents what the particular person observed from the particular person's location within the particular polygon geofenced area;
automatically deliver a reported safety issue(s) to authorized people and systems associated with the particular geofence of when, where and type of safety issue has been reported within the geofence, based on the received safety issue image selection; and
visually map the reported safety issue(s) reported based on geolocation, time and type within a geofence.

12. The system of claim 1, wherein the Key FOB further comprises a button that automatically triggers an alarm and/or a signal in response to a safety risk and/or an emergency.

13. The system of claim 1, wherein the clock in/clock out button is activated when the user begins working on a task inside the geofenced area or stops working on the task.

14. A system for tracking activity in an area, comprising:
one or more Internet Connected Devices (ICDs);
a remote cloud-based server;
installed on an ICD and/or the remote cloud-based server:
  a geofence definer;
  an entrance/exit determiner; and
  a time calculator;
  wherein the geofence definer uses unlimited non-symmetrical polygon points to define a geofenced area;
  wherein the entrance/exit determiner makes determinations as to whether a user has entered or exited the geofenced area; and
  wherein the time calculator calculates a time the user spent in the geofenced area and outside of the geofenced area;
a Key FOB comprising a USB port, clock in/clock out button, camera, internal memory, battery and clock, the internal memory storing a program comprising computer executable instructions executed by at least one processor, the at least one processor running the program for syncing data with one of the ICDs and for gathering Global Positioning System (GPS) coordinates, time when the clock in/clock out button is pressed and image data;
a Smart Lockbox comprising an external USB port, camera, scanner, battery and internal memory; and
a task verifier installed on the ICD and/or the remote cloud-based server that determines whether the user performed a particular task during the time in the geofenced area;
wherein the entrance/exit determiner determines whether a user has entered or exited the geofenced area when the user selects the clock in/clock out button.

15. A system for tracking activity in an area, comprising:
one or more Internet Connected Devices (ICDs);
a remote cloud-based server;
security cameras;
a Closed Circuit TV system;
sensors within the ICD;
data systems;
a facial recognition system;
a Key FOB comprising a USB port, button, camera, internal memory, battery and clock, the internal memory storing a program comprising computer executable instructions executed by at least one processor, the at least one processor running the program for syncing data with one of the ICDs and for gathering GPS, time and image data when the button is pressed; and
installed on the ICD and/or the remote cloud-based server:
  a geofence definer;
  an entrance/exit determiner;
  a time calculator;
  a safety issue reporter;
  a safety issue notifier;
  a safety issue visual mapper;
  a safety rating engine;
  a safety information displayer; and
  a credibility rating engine;
wherein the security cameras, closed circuit TV system, sensors, and facial recognition system obtain data from the geofenced area and send the data to the remote cloud-based server;
wherein the safety issue reporter allows users to report a safety issue using their ICD by selecting a safety issue image that represents what the user observed from the user's location within the geofenced area;
wherein the safety issue notifier automatically delivers a reported safety issue to authorized people and systems associated with the geofenced area including when, where and a type of safety issue that has been reported within the geofenced area;
wherein the safety issue visual mapper visually maps reported safety issues reported based on geolocation, time and type within the geofenced area;
wherein the safety rating engine defines one area or multiple areas within the geofenced area using polygon points, receives user self-ratings of how safe they perceive one area or multiple areas to be, and uses provided self-ratings in conjunction with historical safety incidence information within the geofenced area to assign an overall safety score;
wherein assigning the overall safety score comprises calculating a safety number based on a number of users who have given safety perception ratings within a pre-determined numerical range and multiplying by a number of specific types of incidences that have occurred within the geofence to generate an overall safety score;
wherein the overall safety score defines types of incidents that occur in the area;
wherein the safety rating engine also adjusts the overall safety score based on a time that a user plans to be within the polygon geofence;
wherein the safety information displayer displays historical and real-time data for safety issues, crimes and date/time that occurred in one area or multiple areas on the ICD and displays a visual rendering of relative safety rating for each geofenced area using iconography;
wherein the credibility rating engine receives a safety issue reported by a user, and uses information about the user in conjunction with historical safety incidence and safety rating information from the area of the reported safety issue to assign an overall credibility score to the reported safety issue received;
wherein assigning the overall credibility score comprises calculating a credibility number based on a user's profile, safety rating of the area, type of safety issue, other users' safety reports for the area within a predetermined numerical range and adding the numbers to generate an overall credibility score for the reported safety issue;
wherein the geofence definer uses unlimited non-symmetrical polygon points to define a geofenced area;
wherein the entrance/exit determiner makes determinations as to whether a user has entered or exited the geofenced area; and
wherein the time calculator calculates a time the user spent in the geofenced area and outside of the geofenced area.

16. The system of claim 15, wherein the button is a clock in/clock out button.

17. A system for tracking activity in an area and for delivering signature required and non-signature required objects, comprising:
one or more Internet Connected Devices (ICDs);
a remote cloud-based server;
installed on an ICD and/or the remote cloud-based server:
  a geofence definer;
  a device comprising a clock in/clock out button and a clock;

an entrance/exit determiner; and
a time calculator;
a delivery vehicle; and
a delivery manager installed on an ICD and/or the remote cloud-based server;
wherein the delivery manager notifies a property owner on their ICD when a delivery vehicle gets within a designated radius of a delivery location that the delivery is nearby and to be onsite,
sends a picture of the condition and location of an object delivered to the property owner when the object is placed within the geofenced area, and for signature required deliveries, including in the notice the option to reschedule the delivery to another date or to electronically authorize the delivery to be made;
wherein the geofence definer uses unlimited non-symmetrical polygon points to define a geofenced area;
wherein the entrance/exit determiner makes determinations as to whether a user has entered or exited the geofenced area when the user selects the clock in/clock out button; and
wherein the time calculator calculates a time the user spent in the geofenced area and outside of the geofenced area.

18. A system for tracking activity in an area and for delivering digital materials and content to an Internet connected "smart mail box", comprising:
one or more Internet Connected Devices (ICDs);
a remote cloud-based server;
installed on an ICD and/or the remote cloud-based server:
a geofence definer;
a device comprising a clock in/clock out button and a clock;
an entrance/exit determiner; and
a time calculator;
a smart mailbox comprising an electronic locking system, a rechargeable battery, a solar recharging device, and a memory flash drive;
a mail delivery vehicle;
API tools adapted to communicate with post office web services; and
a digital file transmitter installed on an ICD and/or the remote cloud-based server;
wherein the digital file transmitter:
sends digital files and mailing addresses to consumers' accounts, transmits digital files and mailing addresses to a post office to be distributed to a correct delivery person's ICD or vehicle ICD, transmits the digital files from the delivery person's ICD to the property owner's smart mailbox, responsive to transmission of the digital files to the property owner's mobile site watch (MSW) smart mailbox, transmits the digital files to the property owner's ICD and providing the property owner the ability to review the digital files and decide to accept future digital files from a business or deny future digital files from a business, and
notifies a business of addresses that will no longer accept future digital mailings;
wherein the geofence definer uses unlimited non-symmetrical polygon points to define a geofenced area;
wherein the entrance/exit determiner makes determinations as to whether a user has entered or exited the geofenced area when the user selects the clock in/clock out button; and
wherein the time calculator calculates a time the user spent in the geofenced area and outside of the geofenced area.

19. A method for delivering objects, comprising:
electronically notifying a property owner on their Internet Connected Device (ICD) via an application software when a delivery vehicle gets within a designated radius of the delivery location that the delivery is nearby and to be onsite;
placing delivered objects within a polygon geofenced delivery zone; and
sending a picture of the condition and location of the object delivered to the property owner;
wherein for signature required deliveries, the notice to the property owner's ICD includes options in the application software to reschedule the delivery to another date or to electronically authorize the delivery to be made,
wherein at least one of the following is performed using a system comprising:
one or more Internet Connected Devices (ICDs);
a remote cloud-based server; and
installed on an ICD and/or the remote cloud-based server:
a geofence definer;
a device comprising a clock in/clock out button and a clock;
an entrance/exit determiner; and
a time calculator;
wherein the geofence definer uses unlimited non-symmetrical polygon points to define a geofenced area;
wherein the entrance/exit determiner makes determinations as to whether a user has entered or exited the geofenced area when the user selects the clock in/clock out button; and
wherein the time calculator calculates a time the user spent in the geofenced area and outside of the geofenced area.

\* \* \* \* \*